United States Patent
Nakamura et al.

(10) Patent No.: US 8,374,484 B2
(45) Date of Patent: Feb. 12, 2013

(54) INFORMATION RECORDING APPARATUS AND METHOD, INFORMATION REPRODUCING APPARATUS AND METHOD, INFORMATION RECORDING MEDIUM, PROGRAM STORAGE MEDIUM, AND PROGRAM

(75) Inventors: Masanobu Nakamura, Tokyo (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1600 days.

(21) Appl. No.: 10/258,464

(22) PCT Filed: Feb. 21, 2002

(86) PCT No.: PCT/JP02/01548
§ 371 (c)(1),
(2), (4) Date: Oct. 24, 2002

(87) PCT Pub. No.: WO02/069339
PCT Pub. Date: Sep. 6, 2002

(65) Prior Publication Data
US 2003/0108335 A1    Jun. 12, 2003

(30) Foreign Application Priority Data

Feb. 28, 2001    (JP) ................ 2001-055376

(51) Int. Cl.
*H04N 9/80*    (2006.01)
(52) U.S. Cl. ........................ 386/241; 386/295
(58) Field of Classification Search ............ 386/6–8, 386/68–70, 95, 111, 112, 125, 126, 11
See application file for complete search history.

(56) References Cited

U.S. PATENT DOCUMENTS

| 5,237,553 A | 8/1993 | Azumatani et al. |
| 5,793,726 A * | 8/1998 | Nagano ............... 369/47.23 |
| 5,902,115 A * | 5/1999 | Katayama ............. 434/307 A |
| 6,104,684 A | 8/2000 | Moriyama |
| 6,181,870 B1 * | 1/2001 | Okada et al. ............... 386/95 |
| 6,330,392 B1 * | 12/2001 | Nakatani et al. ........... 386/288 |

(Continued)

FOREIGN PATENT DOCUMENTS

| EP | 0749124 | 12/1996 |
| EP | 0 905 692 | 3/1999 |

(Continued)

OTHER PUBLICATIONS

Japanese Office Action dated Sep. 1, 2009.

*Primary Examiner* — Huy T Nguyen
(74) *Attorney, Agent, or Firm* — Frommer Lawrence & Haug LLP; William S. Frommer; Ellen Marcie Emas

(57) ABSTRACT

In an information recording apparatus and method, information reproducing apparatus and method, information recording medium, program storage medium, and program, the titles of contents can be read out rapidly to be displayed. Allocation class is provided as attribute information relating to the attributes of files to be recorded on an optical disc, and files with the class of Gathered File are collectively recorded in a Gathered File area which is formed at a prescribed position on the optical disc. File 1 to File 3 including the titles of the contents are recorded in this Gathered File area. The recording area between A1 and A2 for FSD (File System Descriptor) is fixed but the recording area between A3 and A4 of the Gathered File area can be changed if necessary.

19 Claims, 40 Drawing Sheets

U.S. PATENT DOCUMENTS

| | | | |
|---|---|---|---|
| 2001/0046373 A1* | 11/2001 | Ando et al. | 386/95 |
| 2001/0053280 A1* | 12/2001 | Yamauchi et al. | 386/95 |
| 2002/0061186 A1* | 5/2002 | Nonomura et al. | 386/95 |
| 2003/0175016 A1* | 9/2003 | Mori et al. | 386/95 |
| 2004/0264947 A1* | 12/2004 | Okada et al. | 386/125 |

FOREIGN PATENT DOCUMENTS

| | | |
|---|---|---|
| EP | 0797205 | 4/1999 |
| EP | 0 953 977 | 11/1999 |
| JP | 62 205590 | 9/1987 |
| JP | 02 132692 | 5/1990 |
| JP | 03 260823 | 11/1991 |
| JP | 07-175710 | 7/1995 |
| JP | 08-221303 | 8/1996 |
| JP | 9-185864 | 7/1997 |
| JP | 9-259574 | 10/1997 |
| JP | 10-69754 | 3/1998 |
| JP | 10-83659 | 3/1998 |
| JP | 10 289533 | 10/1998 |
| JP | 11-317059 | 11/1999 |
| JP | 2001-243723 | 9/2001 |
| JP | 2001 282588 | 10/2001 |
| WO | WO 96/13035 | 5/1996 |

* cited by examiner

File System Descriptor

| BP | Length | Name | Contents |
|---|---|---|---|
| 0 | 8 | Signature | SigRec |
| 8 | 4 | Creation Time | TimeStamp |
| 12 | 4 | Modification Time | TimeStamp |
| 16 | 1 | Interchange Class | Unit8 |
| 17 | 3 | Reserved | #00 bytes |
| 20 | 4 | Start Address of Main MIA | Unit32 |
| 24 | 4 | Start Address of Reserve MIA | Unit32 |
| 28 | 2 | Length of MIA | Unit16 |
| 30 | 2 | Number of MIA Map Sectors(=x) | Unit16 |
| 32 | 2x | MIA Map Sectors in Main MIA | bytes |
| 32+2x | 2x | MIA Map Sectors in Reserve MIA | bytes |

FIG. 6

MIA Map for File System

| BP | Length | Name | Contents |
|---|---|---|---|
| 0 | 8 | Signature | SigRec |
| 8 | 2 | Start Address of MIA Map | Unit16 |
| 10 | 2 | Start Address of File Table | Unit16 |
| 12 | 2 | Start Address of Disc Region Table | Unit16 |
| 14 | 2 | Start Address of Allocation Rule Set Table | Unit16 |
| 16 | 2 | Start Address of File Name Table | Unit16 |
| 18 | 2 | Start Address of Defect Information Table | Unit16 |
| 20 | 2 | Start Address of Extended Attribute Table | Unit16 |
| 22 | 2 | Number of Implementation Use Descriptors(=$N_D$) | Unit16 |
| 24 | $2N_D$ | Implementation Use Descriptor Pointers | DPointer |
| 24+4$N_D$ | 2$N_{MIB}$ | Map Entries | bytes |

FIG. 7

Map Entry

| Value | Interpretation |
|---|---|
| #0000-#FFEF | Next MIB Number |
| #FFF0 | Unusable MIB |
| #FFF1 | Unused MIB |
| #FFF2-#FFFE | Reserved |
| #FFFF | Last MIB of the data structure |

FIG. 8

SigRec format

| RBP | Length | Name | Contents |
|---|---|---|---|
| 0 | 4 | Identification | bytes (="JAFS"=) |
| 4 | 1 | Version | Unit9 (=1) |
| 5 | 1 | Data Type | Unit8 |
| 6 | 2 | Reserved | #00 bytes |

FIG. 9

Data Type

| Value | Interpretation |
|---|---|
| 0-15 | Reserved |
| 16 | File System Descriptor |
| 17 | MIA Map for File System |
| 18 | File Table |
| 19 | Disc Region Table |
| 20 | Allocation Rule Set Table |
| 21 | File Name Table |
| 22 | Defect Information Table |
| 23 | Extended Attribute Table |
| 24-255 | Reserved |

FIG. 10

```
[File Table] {
    <File Table Header>
    <File Record> 1+
}
```

FIG. 11

Generic File Record Format

| RBP | Length | Name | Contents |
|---|---|---|---|
| 0 | 2 | File Name | Unit16 |
| 2 | 2 | Next Link | Unit16 |
| 4 | 2 | Parent Link | Unit16 |
| 6 | 2 | Attribute | Unit16 |
| 8 | 2 | Extended Attribute Record Number | Unit16 |
| 10 | 1 | File Record Type | Unit8 |
| 11 | 13 | File Record Type Dependent | bytes |
| 24 | 4 | Creation Time | TimeStamp |
| 28 | 4 | Modification Time | TimeStamp |

FIG. 12

File Record Type

| Value | File Record |
|---|---|
| 0 | Free File Record |
| 1 | Directory File Record |
| 2 | Data File Record |
| 3-255 | Reserved |

FIG. 15

File Record Type Dependent Field of Directory File Record

| RBP | Length | Name | Contents |
|---|---|---|---|
| 10 | 1 | File Record Type | Unit8(=1) |
| 11 | 1 | Reserved | #00 bytes |
| 12 | 2 | Child Link | Unit16 |
| 14 | 10 | Reserved | #00 bytes |

FIG. 16

File Record Type Dependent field of Data File Record

| RBP | Length | Name | Contents |
|---|---|---|---|
| 10 | 1 | File Record Type | Unit8(=2) |
| 11 | 1 | Allocation Class | Unit8 |
| 12 | 2 | Disc Region Record Number | Unit16 |
| 14 | 2 | Spare Disc Region Record Number | Unit16 |
| 16 | 8 | Data Length | Unit64 |

Allocation Class

| Value | Interpretation |
|---|---|
| 0 | Data Files |
| 1 | Real-time files |
| 2 | Gathered files |
| 3-255 | Reserved |

FIG. 19

```
[Disc Region Table] {
    <Disc Region Table Header>
    <Disc Region Record> 0+
}
```

FIG. 20

Disc Region Record

| RBP | Length | Name | Contents |
|---|---|---|---|
| 0 | 4 | Start Logical Block Number | Unit32 |
| 4 | 4 | End Logical Block Number | Unit32 |
| 8 | 2 | Start Offset | Unit16 |
| 10 | 2 | End Offset | Unit16 |
| 12 | 2 | Reserved | #00 bytes |
| 14 | 2 | Next Disc Region Record | Unit16 |

FIG. 21

[Allocation Rule Set Table] {
    <Allocation Rule Set Table Header>
    <Allocation Rule Set Record> 1
}

FIG. 22

Generic Allocation Rule Set Record Format

| RBP | Length | Name | Contents |
|---|---|---|---|
| 0 | 1 | Domain | Unit8 |
| 1 | 1 | Type | Unit8 |
| 2 | 2 | Length of Parameters (=Np) | Unit16 |
| 4 | 4 | Reserved | #00 bytes |
| 8 | Np | Parameters | bytes |

FIG. 23

| |
|---|
| TOTAL OF AREAS (N) |
| START ADDRESS OF AREA 1 |
| END ADDRESS OF AREA 1 |
| START ADDRESS OF AREA 2 |
| END ADDRESS OF AREA 2 |
| : |
| START ADDERESS OF AREA N |
| END ADDRESS OF AREA N |

FIG. 24

```
[File Name Table] {
    <File Name Table Header>
    <File Name Record> 0+
}
```

FIG. 25

The first File Name Record

| RBP | Length | Name | Contents |
|---|---|---|---|
| 0 | 2 | Next File Name Record | Unit16 |
| 2 | 2 | Length | Unit16 |
| 4 | 28 | File Name Info | Bytes |

FIG. 26

Other File Name Record in the linked list

| RBP | Length | Name | Contents |
|---|---|---|---|
| 0 | 2 | Next File Name Record | Unit16 |
| 2 | 30 | File Name Info | Bytes |

FIG. 27

| FILE | HEAD ADDRESS |
|---|---|
| File 1 | A23 |
| File 2 | A21 |
| File 3 | A25 |

FIG. 38

| FILE | HEAD ADDRESS |
|---|---|
| File 2 | A21 |
| File 1 | A23 |
| File 3 | A25 |

FIG. 39

| File name | Allocation class | Robust bit of Attribute Field |
|---|---|---|
| info.dvr | Group-1 files | 1 |
| menu.tidx | Group-1 files | 1 |
| mark.tidx | Group-1 files | 1 |
| menu.tdt1 | Group-3 files | 0 |
| menu.tdt2 | Group-3 files | 0 |
| mark.tdt1 | Group-4 files | 0 |
| mark.tdt2 | Group-4 files | 0 |
| xxxxx.rpls | Group-1 files | 1 |
| yyyyy.vpls | Group-1 files | 1 |
| zzzzz.clpi | Group-2 files | 1 |
| zzzzz.m2ts | Real-time files | 0 |
| FILES OTHER THAN ABOVE | Data files | 0 or 1 |

FIG. 43

Allocation Info of DVR files

| RBP | Length | Name | Contents |
|---|---|---|---|
| 0 | 8 | LB Region for Gathered files | bytes |
| 8 | 8 | Last Written Logical Block Number of LB Regions for Gathered files | Uint64 |
| 16 | 8 | Main LB Region for Group-1 files | bytes |
| 24 | 8 | Reserve LB Region for Group-1 files | bytes |
| 32 | 8 | Main LB Region for Group-2 files | bytes |
| 40 | 8 | Reserve LB Region for Group-2 files | bytes |
| 48 | 8 | LB Region for Group-3 files | bytes |
| 56 | 8 | LB Region for Group-4 files | bytes |

FIG. 49

LB Region

| RBP | Length | Name | Contents |
|---|---|---|---|
| 0 | 4 | Start Logical Block Number | Unit32 |
| 4 | 4 | End Logical Block Number | Unit32 |

FIG. 50

INFORMATION RECORDING APPARATUS AND METHOD, INFORMATION REPRODUCING APPARATUS AND METHOD, INFORMATION RECORDING MEDIUM, PROGRAM STORAGE MEDIUM, AND PROGRAM

TECHNICAL FIELD

This invention relates to an information recording apparatus and method, information reproducing apparatus and method, information recording medium, program storage medium and program, and more particularly, relates to an information recording apparatus and method, information reproducing apparatus and method, information recording medium, program storage medium and program which are capable of immediately displaying the titles of information stored in the information recording medium.

BACKGROUND ART

Various kinds of optical discs have been proposed as a recordable disc medium which is removable from a recording/reproducing apparatus. Such recordable optical discs are proposed as media having large capacity of several gigabytes and are highly expected as media for recording a AV (Audio Visual) signal such as a video signal.

One of the encoding methods for performing digital compression on a digital video signal is an MPEG (Moving Picture Experts Group) 2 scheme. This MPEG2 is applied to record a digital video signal on a recording medium. For example, in the case of recording an analog video signal on a recording medium, the video signal is encoded by the MPEG2 scheme and then an encoded bit stream is recorded on the recording medium. Further, in recent digital TV broadcasting, a video program is encoded by the MPEG2 scheme and then transmitted in the form of a transport stream. In the case of recording digital broadcasting on the recording medium, a method of recording a transport stream in the form of a digital signal, without performing decoding and re-encoding, is used.

A disc medium is superior in performing random-access processing. In the case of recording a digital video signal on a disc recording medium with this property, even free areas are dispersed on the disc medium, recording can start from one free area and then, can continued by searching the disc medium for free areas.

The number of contents to be recorded increases with an increase in the capacity of an optical disc. Each content is recorded together with its title onto the optical disc. Then, the titles are read and displayed when the optical disc is put into a reproducing apparatus. A user can select a desired title to reproduce the contents of the title.

Conventionally, the titles of contents are recorded in arbitrary different areas on the optical disc. Therefore, such problem arises that it takes time to read and display the titles.

DESCRIPTION OF THE INVENTION

In view of the foregoing, an object of this invention is to provide an information recording apparatus and method, information reproducing apparatus and method, information recording medium, program storage medium and program, so as to immediately reading and displaying the titles of information recorded on the recording medium.

A first information recording apparatus of this invention is characterized by comprising: an identification means for identifying the location attribute of information to be recorded on an information recording medium, the location attribute relating to the location on the information recording medium; and a recording means for recording the information having the prescribed location attribute in a specified area on the information recording medium in accordance with the identification result by the identification means, and also recording the address of the specified area of the information recording medium on the information recording medium.

The plural location attribute is one out of plural location attributes, the identification means specifies the location attribute out of the plural location attributes, and the recording means records the information in an area corresponding to the location attribute out of the plural location attributes, in the specified area, in accordance with the identification result by the identification means.

The identification means further specifies the kind of information, and the recording means can record information in several areas of the specified area in accordance with the identification result by the identification means.

The first information recording apparatus further comprises: a detecting means for detecting continuous free areas in the specified area; a comparison means for comparing the volume of the information with the capacity of areas detected by the detecting means; and a forming means for forming a continuous free area in the specified area depending on the comparison result by the comparison means.

A first information recording method of this invention is characterized by comprising: an identification step of identifying the location attribute of information to be recorded on an information recording medium, the location attribute relating to the location on the information recording medium; and a recording step of recording the information to be recorded on the information recording medium, in a specified area on the information recording medium, based on the identification result by the processing of the identification step, and also recording the address of the specified area of the information recording medium on the information recording medium.

A program on a first program storage medium of this invention is characterized by comprising: an identification step of identifying the location attribute of information to be recorded on an information recording medium, the location attribute relating to the location on the information recording medium; and a recording step of recording the information to be recorded on the information recording medium, in a specified area on the information recording medium, based on the identification result by the processing of the identification step, and also recording the address of the specified area of the information recording medium on the information recording medium.

A first program of this invention makes a computer execute: an identification step of identifying the location attribute of information to be recorded on an information recording medium, the location attribute relating to the location on the information recording medium; and a recording step of recording the information to be recorded on the information recording medium, in a specified area on the information recording medium, based on the identification result by the processing of the identification step, and also recording the address of the specified area of the information recording medium on the information recording medium.

A first information reproducing apparatus of this invention is characterized by comprising: a detecting means for detecting the addresses of a plurality of information recorded in a specified area on an information recording medium; a comparison means for comparing the addresses of the plurality of information detected by the detecting means to each other; a determination means for determining the order for reading the plurality of information based on the comparison result by the comparison means; and a reading means for reading the plurality of information in the order determined by the determination means.

The first information reproducing apparatus further comprises a control means for controlling the display of the titles of the contents corresponding to the plurality of information read by the reading means.

A first information reproducing method of this invention is characterized by comprising: a detecting step of detecting the addresses of a plurality of information recorded in a specified area on an information recording medium; a comparison step of comparing the addresses of the plurality of information detected by the detecting step to each other; a determination step of determining the order for reading the plurality of information based on the comparison result by the comparison step; and a reading step of reading the plurality of information in the order determined by the determination step.

A program on a second program storage medium of this invention is characterized by comprising: a detecting step of detecting the addresses of a plurality of information recorded in a specified area on an information recording medium; a comparison step of comparing the addresses of the plurality of information detected by the detecting step to each other; a determination step of determining the order for reading the plurality of information based on the comparison result by the comparison step; and a reading step of reading the plurality of information in the order determined by the determination step.

A second program of this invention makes a computer execute: a detecting step of detecting the addresses of a plurality of information recorded in a specified area on an information recording medium; a comparison step of comparing the addresses of the plurality of information detected by the detecting step to each other; a determination step of determining the order for reading the plurality of information based on the comparison result by the comparison step; and a reading step of reading the plurality of information in the order determined by the determination step.

A second information reproducing apparatus of this invention is characterized by comprising: a detecting means for detecting the addresses of a plurality of information recorded in a specified area on an information recording medium; an obtaining means for obtaining the location information of the information on the information recording medium; and a reading means for continuously reading information of a kind from the information recording medium based on the location information obtained by the obtaining means.

The specified area can have a plurality of areas corresponding to the location attributes of the information.

The second information reproducing apparatus further comprises a detecting means for detecting the kind of information. And the reading means can read other information out of the information stored in several areas based on the detection result by the detecting means if the reading of the information is failed.

The second information reproducing apparatus further comprises: a storage means for storing the information read by the reading means; and a restoring means for restoring prescribed information out of the information stored in the storage means.

The second information reproducing apparatus further comprises a detecting means for detecting the maximum range of areas where the information has been recorded, in the specified area. And the reading means can read all information recorded within the maximum range detected by the detecting means.

A second information reproducing method of this invention is characterized by comprising: a detecting step of detecting the addresses of a plurality of information recorded in a specified area on an information recording medium; an obtaining step of obtaining the location information of the information on the information recording medium; and a reading step of continuously reading information of a prescribed kind from the information recording medium based on the location information obtained by the processing of the obtaining step.

A program of a third program storage medium of this invention is characterized by comprising: a detecting step of detecting the addresses of a plurality of information recorded in a specified area on an information recording medium; an obtaining step of obtaining the location information of the information on the information recording medium; and a reading step of continuously reading the information of a kind from the information recording medium based on the location information obtained by the processing of the obtaining step.

A third program makes computer execute: a detecting step of detecting the addresses of a plurality of information recorded in a specified area on an information recording medium; an obtaining step of obtaining the location information of the information on the information recording medium; and a reading step of continuously reading the information of a kind from the information recording medium based on the location information obtained by the processing of the obtaining step.

An information recording medium of this invention is characterized in that: a specified area is formed at a prescribed position in order to store first information having a prescribed location attribute out of location attributes relating to the location of information on an information recording medium and files composing CLIPINF; a plurality of first information is recorded in the specified area; and second information as the contents corresponding to the first information is recorded in an area other than the specified area.

The address of the specified area on the information recording medium can be also recorded in an area other than the specified area.

A second information recording apparatus of this invention is characterized by comprising: a control section for controlling management information so as to be recorded in a specified area on an information recording medium and also controlling motion picture information so as to be recorded in an area other than the specified area; and a recording section for recording the motion picture information, the management information and the address of the specified area of the information recording medium on the information recording medium.

A second information recording method of this invention is characterized in that: control is performed so as to record management information in a specified area on an information recording medium and also to record motion picture information in an area other than the specified area; and the motion picture information, the management information and the address of the specified area on the information recording medium are recorded on the information recording medium.

In the second information recording apparatus and method of this invention, PlayList information and thumbnail information can be recorded in the specified area.

In the information recording apparatus and method, program storage medium and program of this invention, information is recorded in a specified area on an information recording medium based on the identification result about the location attribute of the information and the address of the specified area on the information recording medium is recorded on the information recording medium.

In the first information reproducing apparatus and method, program storage medium and program of this invention, the order for reading a plurality of information is determined based on the comparison result about the addresses of the plurality of information stored in the specified area, and the plurality of information is read in the order determined.

In the first information reproducing apparatus and method, program storage medium and program, location information on an information recording medium is obtained so as to continuously read the information of a kind from the information recording medium based on the obtained location information.

In the information recording medium of this invention, a specified area is formed so as to record a plurality of first information in the specified area and to record second information in an area other than the specified area.

BRIEF DESCRIPTION OF THE DRAWINGS

FIG. 6 is a drawing explaining the structure of File System Descriptor.

FIG. 7 is a drawing explaining the structure of MIA Map.

FIG. 8 is a drawing explaining the structure of MAP Entry.

FIG. 9 is a drawing showing the format of Signature.

FIG. 10 is a drawing showing Data Type.

FIG. 11 is a drawing explaining the syntax of File Table.

FIG. 12 is a drawing explaining the structure of File Record.

FIG. 15 is a drawing explaining File Record Type.

FIG. 16 is a drawing explaining the File Record Type Dependent field of Directory File Record.

FIG. 19 is a drawing explaining Allocation Class.

FIG. 20 is a drawing explaining the syntax of Disc Region Table.

FIG. 21 is a drawing explaining Disc Region Record.

FIG. 22 is a drawing explaining the syntax of Allocation Rule Set Table.

FIG. 23 is a drawing explaining the structure of Allocation Rule Set Record.

FIG. 24 is a drawing explaining data to be recorded in the Parameter field of Allocation Rule Set Table.

FIG. 25 is a drawing explaining the syntax of File Name Table.

FIG. 26 is a drawing explaining the structure of The first File Name Record.

FIG. 27 is a drawing explaining the structure of Other File Name Record.

FIG. 38 is a drawing explaining files before sorting of step S72 of FIG. 35.

FIG. 39 is a drawing explaining files after sorting of step S72 of FIG. 35.

FIG. 43 is a drawing showing the relationship among file name, Allocation class and Robust bit.

FIG. 49 is a diagram explaining the syntax of Allocation Info of DVR files.

FIG. 50 is a diagram explaining the syntax of LB Region.

BEST MODE FOR CARRYING OUT THE INVENTION

Preferred embodiments of this invention will be described with reference to the accompanying drawings.

First, the file structure for recording information on a recording medium will be explained by reference to FIG. 1 and FIG. 2.

Figure 1:
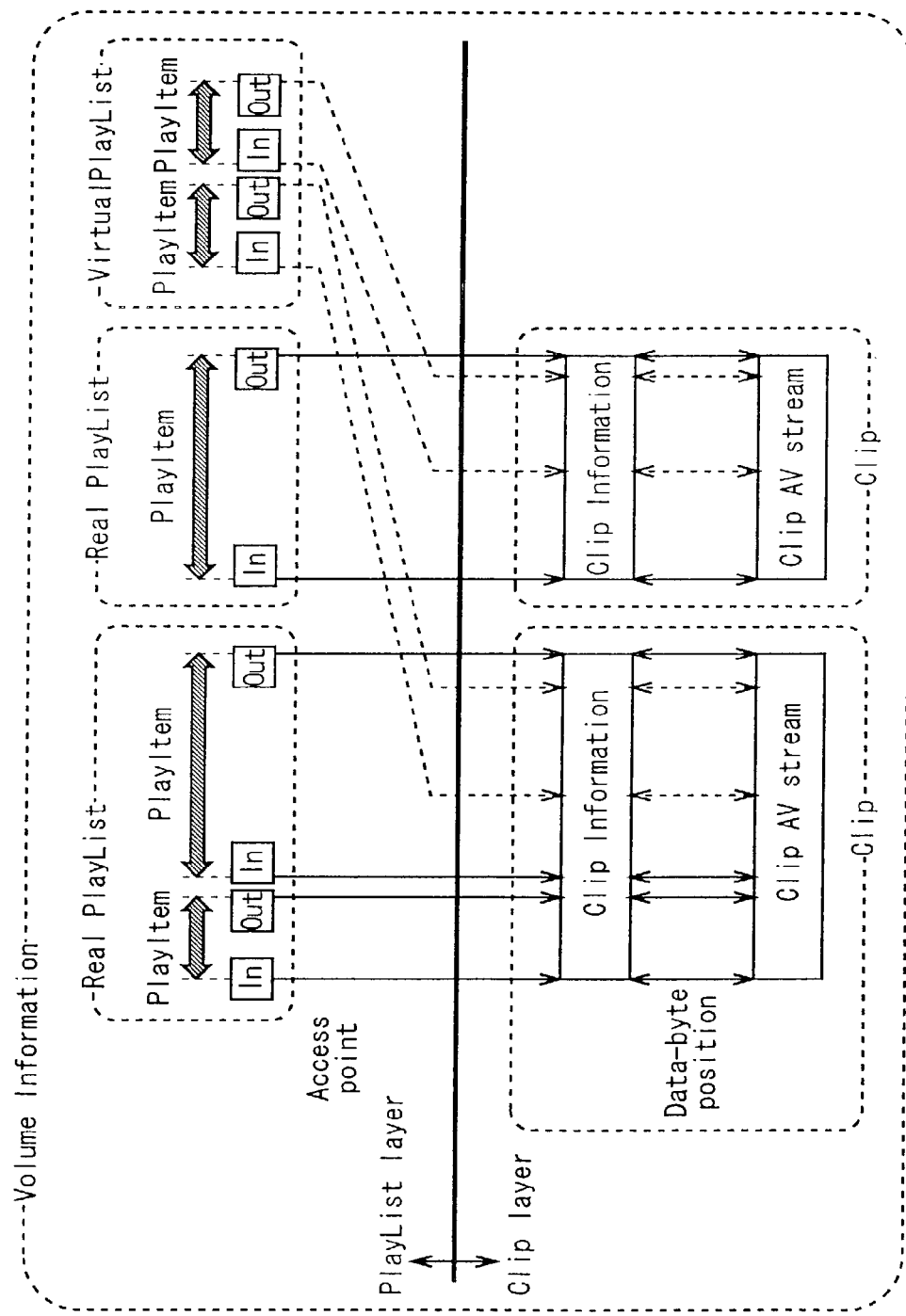
FIG. 1 is a drawing explaining the relationship between PlayList and Clip of this invention.

FIG. 1 shows the simplified structure of an application format of an information recording medium (a recording medium 10 in FIG. 28 which will be described later). This format has two layers, PlayList and Clip, to manage an AV stream. Volume Information manages all Clips and PlayLists on a disc.

A pair of a single AV stream and its attached information is considered as one object and referred to as a Clip. An AV stream file is called a Clip AV stream file and its attached information is called a Clip Information file.

One Clip AV stream file stores data created by reforming a MPEG2 transport stream according to a structure regulated by the DVR (Digital Video Recording) application format.

Data files used in a computer or the like are generally treated as a byte train and on the other hand, the contents in Clip AV stream file are treated on a temporal axis and PlayList designates access points in Clip with, mainly, time stamps. When PlayList gives a time stamp for an access point in Clip, Clip Information file is used for searching for address information (data byte position) at which the stream of the Clip AV stream file should start to be decoded.

PlayList is created so that the user can select zones desired for reproduction from Clip and can edit them with ease. One PlayList is composed of zones for reproduction from Clip. One zone for reproduction from Clip is called PlayItem and is designated by a pair of IN point and OUT point on the temporal axis. Therefore, PlayList is composed of PlayItems.

PlayList has two types: one is Real PlayList and the other is Virtual PlayList.

Real PlayList shares the stream of Clip which is referenced by this Real PlayList. In the other word, Real PlayList occupies the disc by the amount of data equivalent to the stream of Clip which is referenced by this Real PlayList. When an AV stream is recorded as new Clip, Real PlayList for referencing this Clip within zones in which reproduction can be performed is automatically created. If a part of a zone for reproduction is deleted from Real PlayList, the data of the corresponding stream is also deleted from Clip.

Virtual PlayList does not share data of Clip. Even if Virtual PlayList is changed or deleted, Clip does not change at all.

Hereinafter, Real PlayList and Virtual PlayList are simply called PlayList altogether in the following explanation.

Necessary directories on a DVR disc are as follows: root directory having "DVR" directory which has "PLAYLIST" directory, "CLIPINF" directory, "STREAM" directory and "DATA" directory.

The root directory may have subordinate directories other than above, but they are not considered in the DVR application format.

Figure 2:
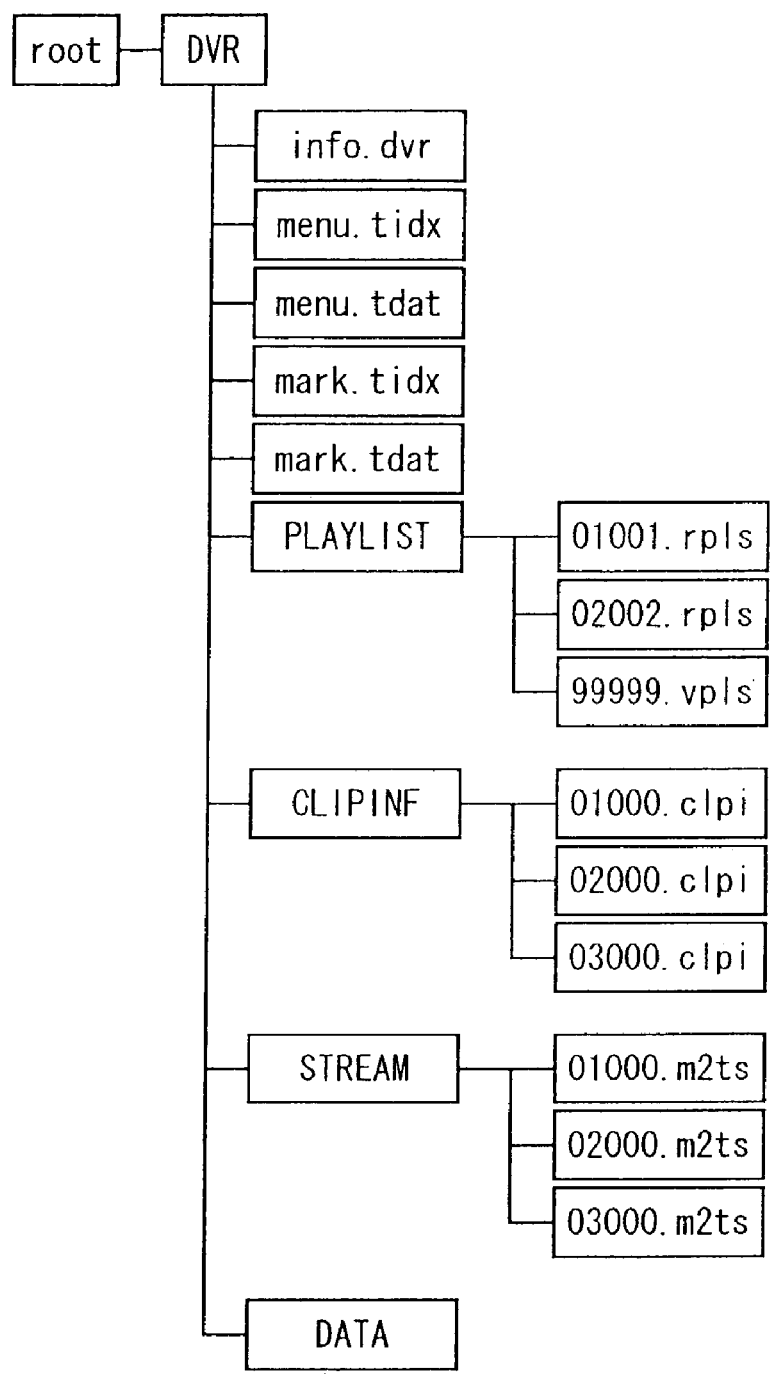
FIG. 2 is a drawing showing the directory structure of this invention.

FIG. 2 shows an example of the directory structure on the DVR disc. As shown in this figure, root directory has one directory.

"DVR" . . . All files and directories regulated by DVR application format should be subordinate to this directory.

"DVR" directory has directories which will be explained below.

"PLAYLIST" . . . Database files of Real PlayList and Virtual PlayList should be subordinate to this directory. This directory should exist even there is no PlayList.

"CLIPINF" . . . Clip databases should be subordinate to this directory. This directory should exist even there is no Clip.

"STREAM" . . . AV stream files should be subordinate to this directory. This directory should exist even there is no AV stream file.

"PLAYLIST" directory stores two kinds of PlayList files. One is for Real PlayList and the other is for Virtual PlayList.

"xxxxx.rpls" . . . This file is to store information on one Real PlayList. One file is created for each Real PlayList. The file name is "xxxxx.rpls". "xxxxx" is composed of five numerals, from 0 to 9. The extension of this file should be "rpls".

"yyyyy.vpls" . . . This file is to store information on one Virtual PlayList. One file is created for each Virtual PlayList. The file name is "yyyyy.vpls". "yyyyy" is composed of five numerals, from 0 to 9. The extension of this file should be "vpls".

"CLIPINF" directory has files each corresponding to one AV stream file.

"zzzzz.clpi" . . . This file is a Clip Information file corresponding to one AV stream file (Clip AV steam file or Bridge-Clip AV stream file). The file name is "zzzzz.clpi" and "zzzzz" is composed of five numerals, from 0 to 9. The extension of this file should be "clpi".

"STREAM" directory stores the files of AV streams.

"zzzzz.m2ts" . . . This file is an AV stream file which is treated by the DVR system. This is a Clip AV stream file or Bridge-Clip AV stream file. The file name is "zzzzz.m2ts" and "zzzzz" is composed of five numerals, from 0 to 9. The extension of this file should be "m2ts".

One AV stream file and its corresponding Clip Information file should have the same five numerals "zzzzz".

Since other directories and file names are not necessary to carry out the embodiment of this invention, explanations of them are omitted.

Figure 3:
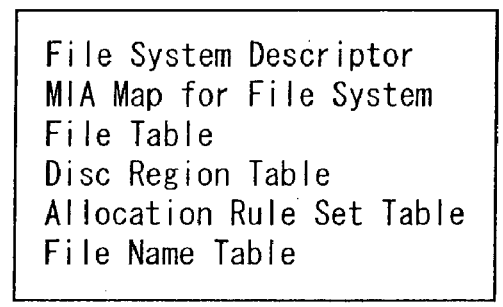
FIG. 3 is a drawing explaining the relevant information table of this invention.

Next, a file management system to which this invention is applied will be explained. As shown in FIG. 3, this invention uses six kinds of management information tables of File System Descriptor, MIA Map for File System, File Table, Disc Region Table, Allocation Rule Set Table, and File Name Table, in order to manage files.

Figure 4:
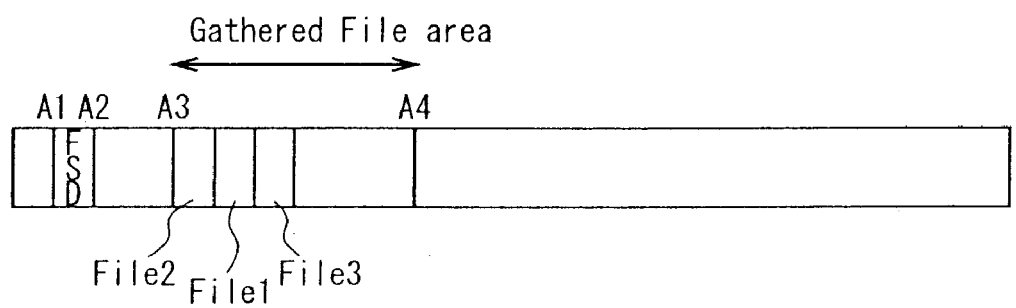
FIG. 4 is a drawing explaining the recording position of Gathered File area of this invention.

File System Descriptor (FSD) out of them is stored between prefixed addresses (A1 and A2, in the case of FIG. 4) on an optical disc as shown in FIG. 4.

Figure 5:
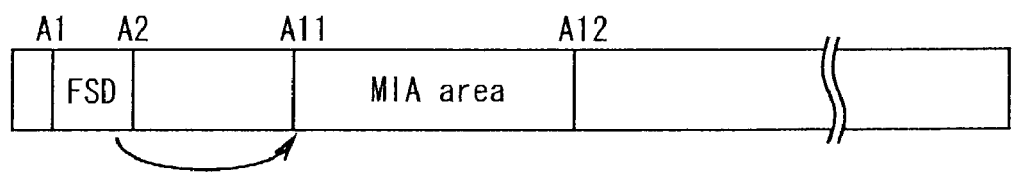
FIG. 5 is a drawing explaining the recording position of MIA area of this invention.

The management information tables other than File System Descriptor are stored in a MIA (Management Information Area) on logical volume as shown in FIG. 5. In this example of FIG. 5, MIA is formed between addresses A11 and A12 on the optical disc, but these addresses are changed when necessary.

The MIA area is formed in two different areas in the logical volume for offering reliance property. One is Main MIA and the other is Reserve MIA.

The locations of the management tables in MIA are indicated by MIA Map and the locations of MIA and MIA Map are indicated by File System Descriptor.

File System Descriptor has a structure shown in FIG. 6.

Signature (BP0) is shown in detail in FIG. 9 which will be explained later. The value of Data Type field of Signature should be 16.

Creation Time (BP8) indicates the creation time of File System Descriptor.

Modification Time (BP12) indicates the update time of File System Descriptor.

Interchange Class (BP16) provides limitations for compatibility of media.

Reserved (BP17) is reserved for future use. #00 should be set in this field.

Start Address of Main MIA (BP20) indicates the initial logical block number of Main MIA.

Start Address of Reserve MIA (BP24) indicates the initial logical block number of Reserve MIA.

Length of MIA (BP28) specifies the volume of MIA on a logical block unit basis. There is no Logical blocks exceeding #FFEF in MIA.

Number of MIA Map Sectors (BP30) specifies the number of blocks for MIA Map to be stored in MIA.

MIA Map Sectors in Main MIA (BP32) specifies all MIBs (Management Information Block) (logical blocks in MIA) which belong to MIA Map in Main MIA. The MIB numbers of these blocks should be recorded in the structuring order of MIA Map.

MIA Map Sectors in Reserve MIA (BP32+2×) specifies all MIBs which belong to MIA Map in Reserve MIA. The MIB numbers of these blocks should be recorded in the structuring order of MIA Map.

MIA Map is used for managing the locations of data structures recorded in MIA. Each record in MAP Entries field corresponds to one MIB (Management Information Block) (a logical block in MIA) and indicates the use condition of MIB. MIA Map has a structure shown in FIG. 7.

Signature (BP0) is shown in FIG. 9 which will be explained later. The value of Data Type field of Signature should be 17.

Start Address of MIA Map (MB8) specifies the first MIB of MIA Map in MIA with MIB number.

Start Address of File Table (BP10) specifies the first MIB of File Table in MIA with MIB number.

Start Address of Disc Region Table (BP12) specifies the first MIB of Disc Region Table in MIA with MIB number.

Start Address of Allocation Rule Set Table (BP14) specifies the first MIB of Allocation Rule Set Table in MIA with MIB number.

Start Address of File Name Table (BP16) specifies the first MIB of File Name Table in MIA with MIB number.

Start Address of Defect Information Table (BP18) specifies the first MIB of Defect Information Table in MIA with MIB number. #FFFF should be set in this field if there is no Defect Information Table in MIA.

Start Address of Extended Attribute Table (BP20) specifies the first MIB of Extended Attribute Table in MIA with MIB number. #FFFF should be set in this field if there is no Extended Attribute Table in MIA.

Number of Implementation Use descriptors (BP22) indicates the number of entries recorded in Implementation Use Descriptor Pointers field.

Implementation Use Descriptor Pointers (BP24) indicates the Data Type and location of Implementation Use Descriptor.

Map Entries (BP24+4ND) indicates the use conditions of MIBs. Each record is recorded with Unit 16. The number of entries is equal to the number of MIBs ($N_{MIB}$) in MIA. The first MAP Entry indicates the use condition of the first MIB, and the second MAP Entry indicates the use condition of the second MIB. The n-th MAP Entry indicates the use condition of the n-th MIB. FIG. 8 shows the meanings of values which can be used in MAP Entry.

The data structure is small enough to be stored in one MIB, #FFFF should be set in Map Entry corresponding to the MIB. When the data structure is composed of several MIBs, a Map Entry has the number of the next MIB and the Map Entry of the last MIB has #FFFF. Map Entry with #FFF1 means that the corresponding MIB is not used and this MIB can be used when a new MIB is required. Map Entry with #FFF0 means that the corresponding MIB can not be used due to, for example, a broken sector.

Signature is recorded in the head of the data structure for identification. SigRec is used for designating its value. Signature is recorded in the format shown in FIG. 9.

The contents of Identification (RBP0) are a letter string of "JAFS".

Version (RBP4) specifies the version number of standards. For example, "1" should be set for indicating JAFS revision 1.

Data Type (RBP5) indicates the type of data structure. A value shown in FIG. 10 should be set in this field in accordance with the type of data structure.

Reserved (RBP0-15, 24-255) should be 0 (reserved for future use).

FIG. 11 shows the syntax of File Table.

As shown in this figure, File Table is composed of File Table Header and at least one File Record.

File Records have the integral number in an increasing order starting with 1. The number is used as File Record number. The first File Record of File Table should be Directory File Record for describing a root directory of its directory hierarchy.

FIG. 12 shows the structure of File Record.

File Name (RBP0) specifies File Name Record Chain which stores a series of byte data for identifying a file or directory which is to be referenced by this File Record. Each file name should be unique in one directory. A directory must not have plural files or directories with the same name. The first File Name Record number of File Name Record Chain is recorded in this field.

Figure 13:
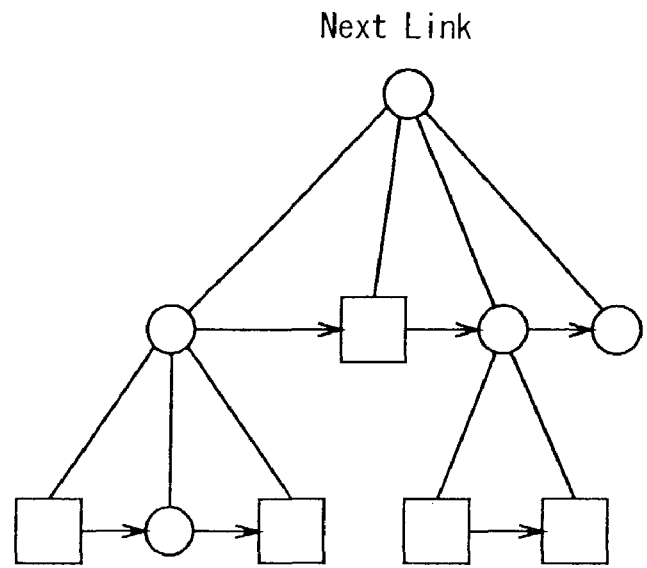
FIG. 13 is a drawing explaining Next Link.

Next Link (RBP2) designates a file or directory which belongs to the same directory as shown in FIG. 13. The File Record number of the file or directory is set in this field. If this File Record is the last entry of the link list, #FFFF should be set in this field.

Figure 14:
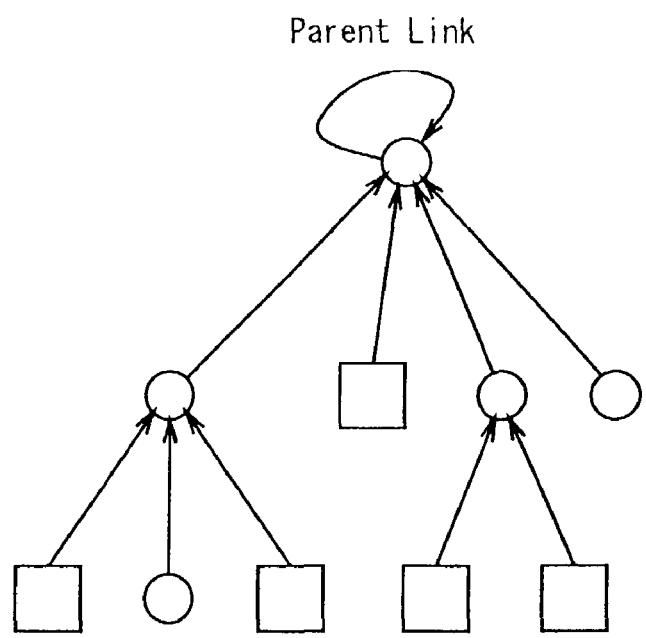
FIG. 14 is a drawing explaining Parental Link.

As shown in FIG. 14, Parent Link (RBP4) specifies the File Record number of the directory to which the file or directory belongs. When this File Record specifies a root directory of a directory hierarchy, File Record number of this File Record should be set in this field.

Attribute (RBP6) specifies an attribute, file or directory, designated by this File Record. Attribute includes Robust bit.

Extended Attribute Record Number (RBP8) designates Extended Attribute Record Chain which stores the extended attribute of either this File record, or the file or directory designated by this File Record. The Record number of the first Record of Extended Attribute Record Chain is stored in this field. If there is no Extended Attribute Record, #FFFF should be set.

File Record Type (RBP10) designates the type of File Record as shown in FIG. 15.

The description of File Record Type Department (RBP11) depends on the value of File Record Type field.

Creation Time (RBP24) indicates the creation time of File Record.

If this File Record is Directory File Record, Modification Time (RBP28) indicates the update time of this directory. If File Record is Data File Record, Modification Time (RBP28) indicates the update time of this file.

Directory File Record in FIG. 15 is used for describing directory. Directory File Record is created as shown in FIG. 12 and its File Record Type Department field is created as shown in FIG. 16.

File Record Type (RBP10) in FIG. 16 should be 1.

Reserved (RBP11) is reserved for future use. 0 should be set in this field.

Figures 17, 18:
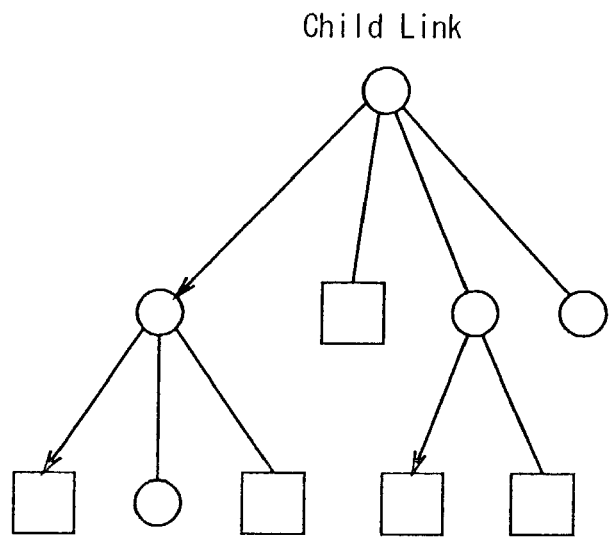
FIG. 17 is a drawing explaining Child Link.
FIG. 18 is a drawing explaining the File Record Type Dependent field of Data File Record.

Child Link (RBP12) designates files and directories which belong to the directory designated by this Directory File Record as shown in FIG. 17. The File Record number of the first File Record designating a file or a directory should be set in this field. If the directory has no files or directories, #FFFF should be set in this field.

Reserved (MBP14) is reserved for future use. 0 Should be set in this field.

Data File Record in FIG. 15 is used for describing a file. Data File Record is created as shown in FIG. 12 and its File Record Type Dependent filed is created as shown in FIG. 18.

File Record Type (RBP10) in FIG. 18 must be 2.

Allocation Class (RBP11) designates the allocation class of the file designated by this Data File Record.

Allocation Class designates the recording feature (location attribute) of the file. DVR application has three types as shown in FIG. 19.

Data files correspond to normal files. Real-Time files correspond to files for data which should be stored or read during a fixed time. For example, a file storing the contents data of AV data is a file of this type.

Gathered files correspond to files which should be read in a short time when an optical disc is inserted into a recording or reproducing apparatus.

For example, Gathered files includes files of PLAYLIST (files with the extension of *.rpls and *.vpls) and files composing CLIPINF (files with the extension of *.clpi) which are shown in FIG. 2.

Disc Region Record Number (RBP12) in FIG. 18 designates file data to be referenced by this Data File Record. The file data is described with a list of Disc Region Record and the number of the first Disc Region Record is set in this field. If there is not Disc Region Record to be referenced, #FFFF should be set in this field.

When Robust bit in Attribute (RBP6) (FIG. 12) field is set to be 1, Spare Disc Region Record Number (RBP14) of FIG. 18 designates spare file data which is to be referenced by this Data File Record. This file data is described with a list of Disc Region Record and the number of the first Disc Region Record is set in this field. If there is no Disc Region Record to be referenced, #FFFF is set in this field.

If the value of Data Length (RBP16) field is #FFFFFFFFFFFFFFFF, this filed does not include valid data. Otherwise, this field designates the length of file data to be referenced by this Data File Record.

Disc Region Table is composed of Disc Region Table Header and at least zero Disc Region Record as shown in FIG. 20.

Disc Region Records have the integral number in an increasing order starting with 1. The number is used as Disc Region Record Number of FIG. 18. A linking list of Disc Region Records is created by setting the number of next Disc Region Record to Next Disc Region Record field (FIG. 21). Then, it is referenced as Disc Region Record Chain. The value of Next Disc Region Record field of the last Disc Region Record in Disc Region Record Chain must be #FFFF.

Disc Region Record indicates the start and end positions of Disc Region and the location of next Disc Region Record in Disc Region Chain. Disc Region Record is created as shown in FIG. 21.

Start Logical Block Number (RBP0) designates a logical block including the first byte of Disc Region. The logical block number is set in this field.

End Logical Block Number (RBP4) designates a logical block having the last byte of Disc Region. The logical block number is set in this field.

Start Offset (RBP8) designates offset from the head of the logical block having the first byte of Disc Region to this byte. If Disc Region starts at the head of the logical block, 0 is set in this field.

End Offset (RBP10) designates offset from the head of the logical block having the first byte to this byte. If the last byte of Disc Region is the first byte of the logical block, 0 is set in this field.

Reserved (RBP12) is reserved for future use. #00 should be set in this field.

The case where the Next Disc Region Record (RBP14) field has the value of 0 means that the Disc Region Record has not been used and can be used for describing new Disc Region. In the other cases, this field designates next Disc Region in Disc Region Record Chain. The number of next Disc Region Record is designated by this field. If this Record is the last entry of Disc Region Record Chain, #FFFF must be set.

Allocation Rule Set Table (FIG. 10) designates an allocation method of file data which the file system uses in the logical volume. Allocation Rule Set Table is composed of Allocation Rule Set Table Header and Allocation Rule Set Record as shown in FIG. 22.

Allocation Rule Set Record is used for specifying an allocation method. Allocation Rule Set Record has a structure shown in FIG. 23.

Domain (RBP0) indicates the value specifying this allocation rule set.

Type (RBP1) indicates the value specifying the type of this allocation rule set. This value is defined by each Domain of allocation rule set.

Length of Parameters (RBP2) specifies the length of Parameters (RBP8) field.

Reserved (RBP4) is reserved for future use. #00 must be set in this field.

Parameters (RBP8) can be used for recording data depending on allocation rule set.

In this invention, three kinds of file attributes are provided as Allocation Class as shown in FIG. 19 and files designated as Gathered files are collectively recorded in the Gathered File area (area between addresses A3 and A4 in FIG. 4) which is a specified area on the optical disc.

Parameters of Allocation Rule Set Record in FIG. 23 stores the locations (start address and end address) of one or plural areas provided in Gathered File on the optical disc and the total number of areas as shown in FIG. 24.

File Name Table (FIG. 10) is composed of File Name Table Header and at least zero File Name Record, as shown in FIG. 25.

File Name Records have the continuous integral number in an increasing order starting with 1. This number is used as File Name Record number.

A file name is described with at least one File Name Record. If the length of the file name is less than 28 bytes, the file name is described with one File Name Record. In the other cases, the file name is described with a linking list of File Name Records. One Record or the list are referenced as File Name Record Chain.

The first File Name Record of Chain is recorded as shown in FIG. 26. The other File Name Records of Chain are recorded as shown in FIG. 27.

0 in Next File Name Record (RBP0) field means that this File Name Record has not been used and can be used for recording new file name.

Next File Name Record (RBP0) in FIG. 26 indicates the number of the next File Name Record which belongs to this File Name Record Chain. If the File Name Record is the last entry in File Name Record Chain, #FFFF must be set in this field.

Length (RBP2) designates the length of file name on a byte unit basis.

File Name Info (RBP4) stores information on file name.

Next File Name Record (RBP0) of FIG. 27 indicates the number of the next File Name Record which belongs to File Name Record Chain. If this File Name Record is the last entry in File Name Record Chain, #FFFF must be set in this field.

File Name Info (RBP2) stores information on file name.

Next, the system of recording and reproducing data having the DVR application structure will be explained with reference to the block diagram of a motion picture recording/reproducing apparatus 1 in FIG. 28.

For example, information recorded on a recording medium 10 which is an optical disc is read by a reading section 11 of a reproducer 61. A demodulator 12 demodulates the data, which has been read by the reading section 11 from the recording medium 10, and then gives the resultant to an ECC decoder 13. The ECC decoder 13 separates the data given from the demodulator 12 into an AV stream and a database to give the AV stream to a source depacketizer 14 and to output the database to a control unit 17.

The source depacketizer 14 depackets the inputted AV stream and outputs the resultant to a demultiplexer 15. The demultiplexer 15 separates the data given from the source depacketizer 15 into video (V), audio (A) and system (S) data, and outputs them to an AV decoder 16 and a multiplexer 25.

The AV decoder 16 decodes the inputted video data and audio data based on the system data and outputs a video signal and an audio signal from terminals 18 and 19, respectively.

An AV encoder 23 of a recorder 62 receives a video signal and audio signal inputted from terminals 21 and 22, respectively. The video signal is also inputted to a video analyzer 24. The AV encoder 23 and video analyzer 24 receives the video signal which is outputted from the AV decoder 16, if necessary, instead of the video signal which is inputted from the terminal 21.

The AV encoder 23 encodes the inputted video signal and audio signal and outputs the encoded video signal (V), audio signal (A), and the system data (S) corresponding to this encoding to the multiplexer 25.

The video analyzer 24 analyzes the inputted video signal and outputs the analysis result to the control unit 17.

A transport stream is inputted from a digital interface or digital television tuner to a terminal 33 and then, is inputted to the demultiplexer 15 via a switch 27, or to a multiplexed stream analyzer 26 and a source packetizer 29 via the switch 27 and a switch 28. The multiplexed steam analyzer 26 and the source packetizer 29 can receive signals outputted from the multiplexer 25 via the switch 28, instead of the signal from the switch 27.

The multiplexed stream analyzer 26 analyzes the inputted signal and outputs the analysis result to the control unit 17. The source packetizer 29 packetizes the inputted signal and gives the resultant to an ECC encoder 30. The ECC encoder 30 also receives databases which are outputted from the control unit 17.

The ECC encoder 30 adds an error correction code to an input, and encodes and then outputs the resultant to a modulator 31. The modulator 31 modulates the data inputted from the ECC encoder 30 and outputs the resultant to a recording section 32. The recording section 32 executes recording processing of data inputted from the modulator 31 on the recording medium 10.

The control unit 17 has a storage unit 17A for storing various data, and controls each section.

A drive 41 may be connected to the control unit 17 to drive an magnetic disk 51, optical disc 52, magneto-optical disc 53 and a semiconductor memory 54.

Note that, the optical disc 52 can be used as the recording medium 10.

First, the basic operation of the motion picture recording/reproducing apparatus 1 to encode and record inputted audio/video signals will be explained.

The video signal and audio signal are inputted from the terminals 21 and 22 of the recorder 62, respectively. The video signal is inputted to the video analyzer 24 and AV encoder 23. The audio signal is also inputted to the AV encoder 23. The AV encoder 23 encodes the inputted video signal and audio signal and outputs the encoded video stream (V), encoded audio stream (A) and system information (S) to the multiplexer 25.

The encoded video stream (V) is, for example, an MPEG2 video stream and the encoded audio stream (A) is, for example, an MPEG1 audio stream or Dolby AC3 (trademark) audio stream. The system information (S) is information for encoding video/audio (byte size of encoded picture and audio frame and picture encoding type and the like) and time information for AV synchronization.

The multiplexer 25 multiplexes the inputted stream based on the inputted system information and outputs the multiplexed stream. The multiplexed stream is, for example, an MPEG2 transport stream or MPEG2 program stream. The multiplexed stream is inputted to the multiplexed stream analyzer 26 and the source packetizer 29. The source packetizer 29 encodes the inputted multiplexed stream in accordance with the application format of the recording medium 10 to generate an AV stream composed of source packets. The AV stream is subjected to addition of an error correction code at the ECC (error correction) encoder 30, and modulation at modulator 31, and then the resultant is inputted to the recording section 32. The recording section 32 records the AV stream file on the recording medium 10 based on a control signal which is given from the control unit 17.

Next, the basic operation will be explained for recording a transport stream of digital TV broadcasting inputted from a digital interface or digital TV tuner not shown, for example.

A transport stream is inputted from the terminal 33. There are two methods for recording an inputted transport stream: one is for transparent recording and the other is for reencoding in order to decrease a recording bit rate and then recording. Command information for a recording method is inputted to the control unit 17 from a terminal 20 serving as a user interface, so that the control unit 17 controls the recording method.

In the case of the transparent recording of an inputted transport stream, the transport stream is input to the multiplexed stream analyzer 26 and the source packetizer 29. The processing thereafter till the AV stream is recorded on the recording medium 10 is the same as that of encoding and recording the inputted audio signal and video signal as described above.

In the case of reencoding and recording the inputted transport stream, the inputted transport stream is inputted to the demultiplexer 15. The demultiplexer 15 inputs the video stream (V) to the AV decoder 16. The AV decoder 16 decodes the video stream and inputs the reproduction video signal to the AV encoder 23. The AV encoder 23 encodes the inputted video and inputs the encoded video stream (V) to the multiplexer 25.

On the other hand, the audio stream (A) and system information (S) outputted from the demultiplexer 15 are directly inputted to the multiplexer 25. The multiplexer 25 multiplexes the inputted audio stream based on the inputted system information and outputs the multiplexed stream. The processing thereafter till the AV stream is recorded on the recording medium 10 is the same as that of encoding and recording the inputted audio/video signals as described above.

This motion picture recording/reproducing apparatus 1 records the AV stream file and also records the application database information relating to the file. The application database information is created by the control unit 17. Input information to the control unit 17 includes feature information of a motion picture from the video analyzer 24, feature information of an AV stream from the multiplexed stream analyzer 26, and user-command information inputted from the terminal 20 serving as a user interface.

The feature information of the motion picture from the video analyzer 24 is generated by the motion picture recording/reproducing apparatus 1 when the motion picture recording/reproducing apparatus 1 itself encodes the video signal. The video analyzer 24 analyzes the contents of the inputted video signal and generates information relating to the pictures of feature mark points in the inputted motion picture signal. This information is command information for the pictures of feature mark points such as a program start point, scene change point and CM start/end points, in the inputted video signal. In addition, this information includes the thumbnail of the picture and the title of the contents. This command information for the picture is inputted to the multiplexer 25 via the control unit 17.

The multiplexer 25, when multiplexing the encoded pictures of the images of the mark points instructed by the control unit 17, returns the address information of the encoded pictures on the AV stream to the control unit 17. The control unit 17 relates the kind of feature image to the address information of the encoded picture on the AV stream and stores them in the storage unit 17A.

The feature information of AV stream from the multiplexed stream analyzer 26 is information relating to the encoded information of the AV stream to be recorded, and is generated by the motion picture recording/reproducing apparatus 1. For example, this information includes time stamps and address information of I-picture of the AV stream, discontinuous information of STC (system time clock), change information in program contents, and arrival time and address information.

The time stamps and address information of I-picture of the AV stream are data to be stored in EP_map. The discontinuous information of STC in the AV stream is data to be stored in SequenceInfo. The change information of program contents in the AV stream is data to be stored in ProgramInfo. And the arrival time and address information in the AV stream are stored in TU_map.

On the other hand, when the transport stream inputted from the terminal 33 is to be transparent-recorded, the multiplexed stream analyzer 26 detects the pictures of feature mark points in the AV stream and creates their kinds and address information. These information are data to be stored in ClipMark.

The feature information of AV stream from the multiplexed stream analyzer 26 is to be stored in a database (Clip Information) of AV stream.

The user-command information from the terminal 20 includes designating information relating to a desired reproduction zone in the AV stream, the character letters which explain the contents of pictures within the reproduction zone, and time stamps in the AV stream for book marks and resume points which are set by a user for favorite scenes. These user command information are to be stored in a database of PlayList.

The control unit 17 creates the database (Clip Information) of AV stream, database of PlayList, management information (info.dvr) for the contents recorded on the recording medium 10, and thumbnail information. These database information are processed by the ECC (error correction) encoder 30 and the modulator 31, in the same way as the AV stream, and then are inputted to the recording section 32. The recording section 32 records this database information on the recording medium 10 as application database information based on the control signal given from the control unit 17.

Next, the basic operation for reproduction will be explained.

The AV stream file and application database information have been recorded on the recording medium 10.

First, the control unit 17 instructs the reading section 11 of the reproducer 61 to read the application database information. Then, the reading section 11 reads the application database information from the recording medium 10 and the application database information is processed through the demodulator 12 and the ECC (error correction) decoder 13 and is inputted to the control unit 17.

The control unit 17 outputs a list of PlayLists recorded on the recording medium 10 based on the application database to the terminal 20 serving as a user interface. The user selects a desired PlayList out of the list of PlayLists and then, the desired PlayList for reproduction is input to the control unit 17. The control unit 17 instructs the reading section 11 to read the AV stream file necessary for the reproduction of the PlayList. The reading section 11 reads the AV stream from the recording medium 10 and the AV stream is processed through the demodulator 12, the ECC decoder 13 and the file system section and is inputted to the source depacketizer 14.

The source depacketizer 14 converts the AV stream having the application format of the recording medium into a stream which can be inputted to the demultiplexer 15. The demultiplexer 15 inputs video stream (V), audio stream (A) and system information (S) which compose the AV stream within the reproduction zone (PlayItem) designated by the control unit 17, to the AV decoder 16. The AV decoder 16 decodes the video stream and audio stream and outputs the reproduction video signal and the reproduction audio signal from the terminals 18 and 19, respectively.

In the case of reproducing the PlayList of EP_map type selected by the user, from some time in the middle of the PlayList, the control unit 17 instructs the reading section 11 to read data from an I-picture address with PTS which is the closest to the designated time.

On the other hand, in the case of reproducing the PlayList of TU_map type selected by the user, from some time in the middle of the PlayList, the control unit 17 instructs the reading section 11 to start reading data at the address of the source packet of the arrival time which is the closest to the designated time.

Furthermore, when the user selects a mark out of a start point and a scene change point of a program stored in ClipMark of Clip Information (for example, this selection operation is performed by displaying a list of thumbnail pictures of the start point and scene change points of the program stored in ClipMark on the user interface and selecting a picture out of them by the user), the control unit 17 determines the readout point of the AV stream on the recording medium 10 based on the contents of Clip Information, and then instructs the reading section 11 to read the AV stream.

That is, the control unit 17 instructs the reading section 11 to read data from an I-picture with an address closest to the address of the picture of the AV stream selected by the user. The reading section 11 starts reading the data at the designated address, and the read data is processed through the demodulator 12, ECC decoder 13 and the file system section, is inputted to the demultiplexer 15 and is decoded at the AV decoder 16, and as a result, the AV data shown by the address of the picture having the mark point is reproduced.

Next, the processing for recording a video stream, mainly the database recording processing, will be explained with reference to the flowchart of FIG. 29.

First, at step S11, the control unit 17 makes the AV encoder 23 encode the inputted video stream and allows the resultant to be recorded on the recording medium 10, as described above. At step S12, the control unit 17 judges whether the recording of the video stream has been finished. When it has not been finished, then the control unit 17 returns to step S11 to continue the encoding and recording processing of the video stream.

When it is judged at step S12 that the encoding and recording processing of the video stream has been finished, then the control unit 17 moves to step S13 to execute the database recording processing.

Figure 30:
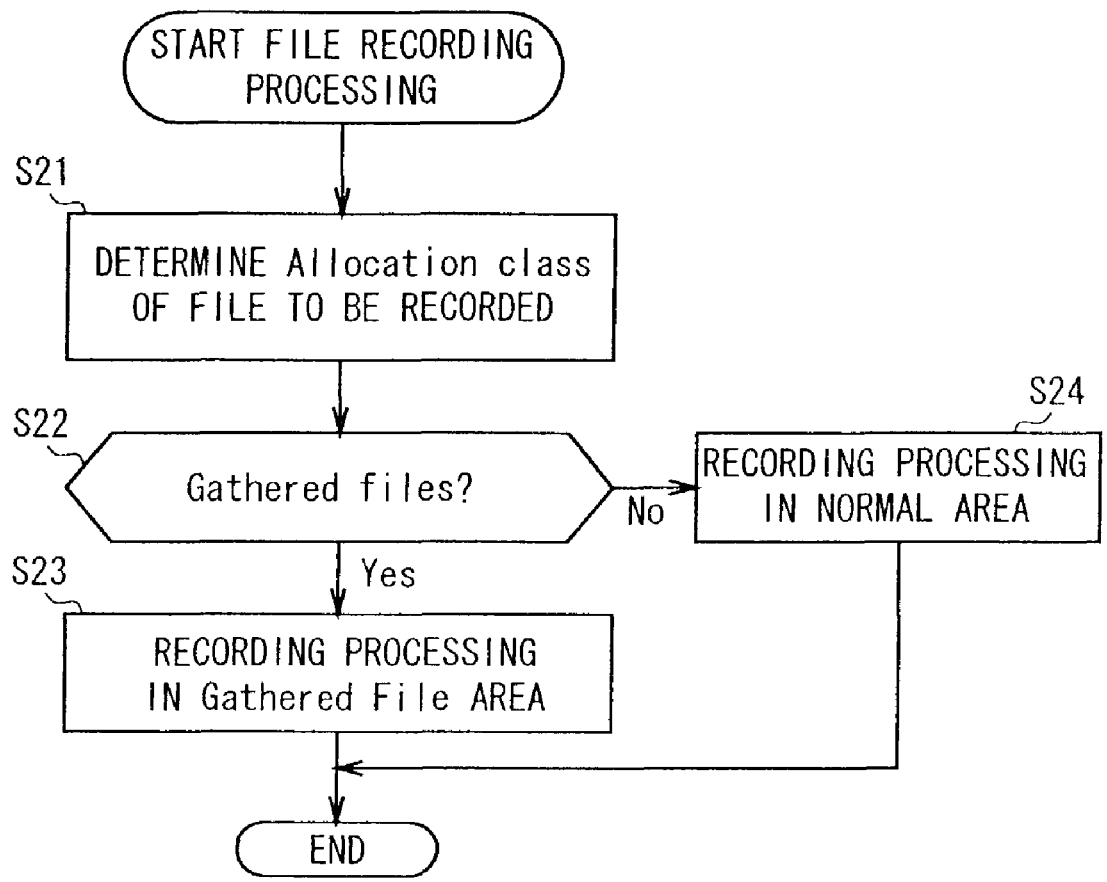
FIG. 30 is a flowchart explaining file recording processing of the motion picture recording/reproducing apparatus of FIG. 28.

In this connection, this database recording processing is executed as one kind of processing of step S23 which is the file recording processing of FIG. 30.

Specifically, in this system, the control unit 17 executes the processing shown in FIG. 30 to record a file. At step S21, the control unit 17 detects the Allocation class (FIG. 19) of the file to be recorded, and judges at step S22 whether the Allocation class of the file indicates Gathered files. When the Allocation class of the file to be recorded indicates Gathered files, then the control unit 17 moves to step S23 to execute processing to record the file in the Gathered File area (FIG. 4).

When it is judged at step S22 that the Allocation class of the file to be recorded does not indicate Gathered files (when it is judged that it is Data files or Real-time files), on the contrary, the control unit 17 moves to step S24 to execute processing of recording in an area (normal area) other than Gathered File area.

Figure 29:
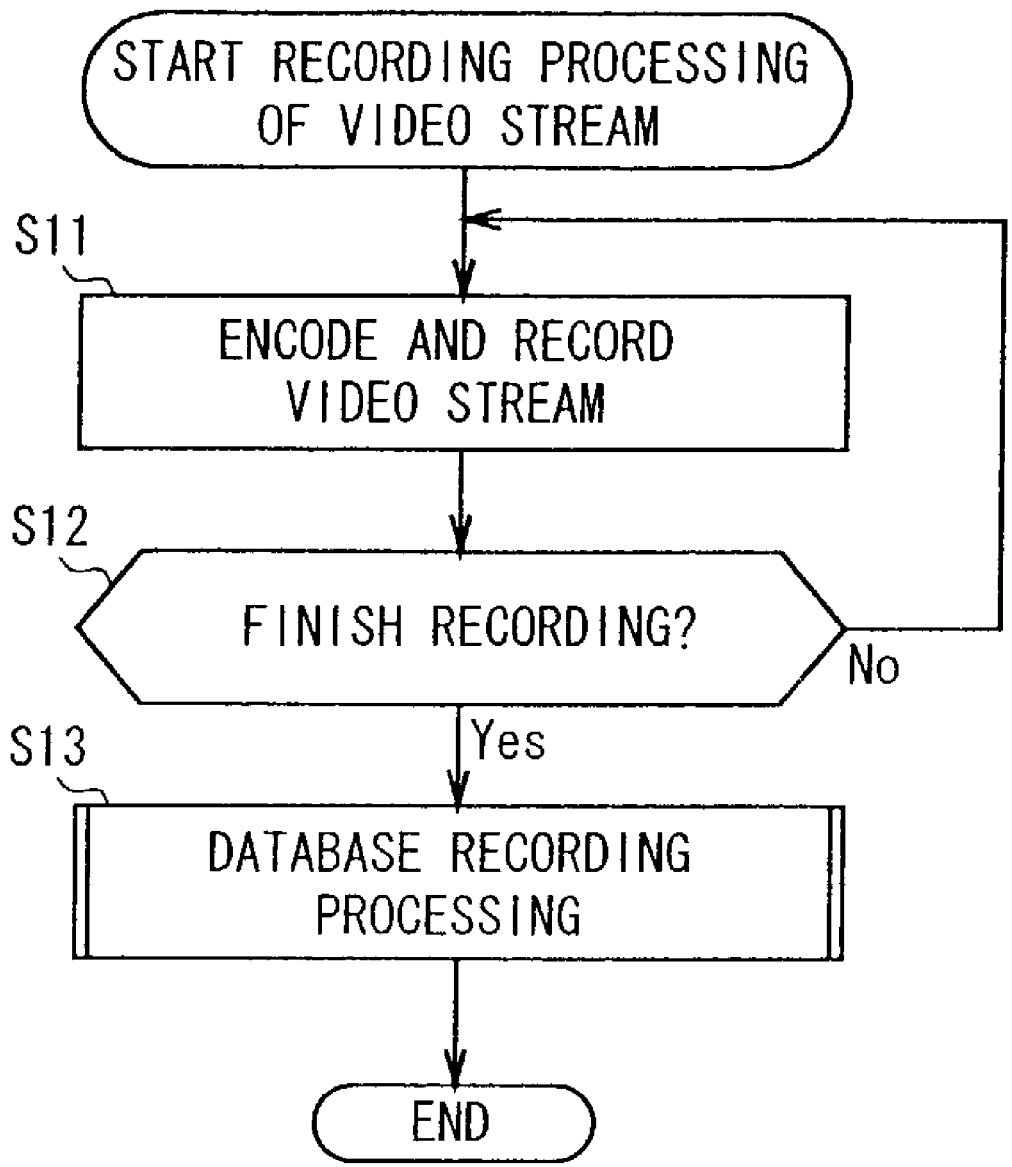
FIG. 29 is a flowchart explaining video stream recording processing of the motion picture recording/reproducing apparatus of FIG. 28.

Although the control unit 17 decides the recording area on the recording medium 10 in accordance with the Allocation class of a file to be recorded as described above, the Allocation classes of the files composing databases to be recorded at step S13 of FIG. 29 are Gathered files, so that the database recording processing at step S13 is executed as recording processing in Gathered File area of step S23 of FIG. 30.

Next, the database recording processing of step S13 of FIG. 29 will be explained in detail with reference to the flowchart of FIG. 31.

First, at step S41, the control unit 17 searches Space Bit Map for free areas. This Space Bit Map is created by executing processing shown by the flowchart of FIG. 32.

Figure 32:
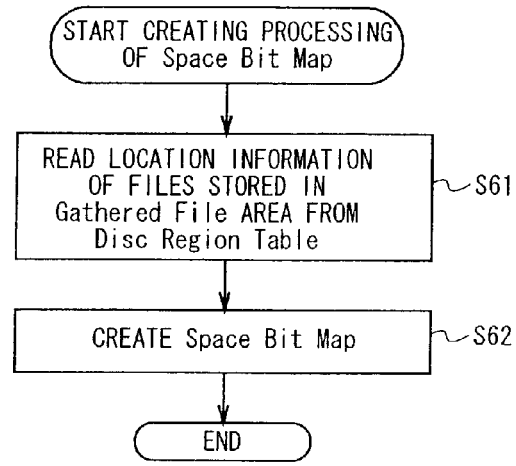
FIG. 32 is a flowchart explaining Space Bit Map creating processing of the motion picture recording/reproducing apparatus of FIG. 28.

That is, the control 17 executes the processing of FIG. 32 when the recording medium 10 (optical disc) is inserted.

At step S61, the control unit 17 reads location information of files stored in Gathered File area of the inserted disc, from Disc Region Table (FIG. 20 and FIG. 21) of this disc. Then, at step S62, the control unit 17 executes the processing to create Space Bit Map based on the readout results of step S61.

Figure 33:
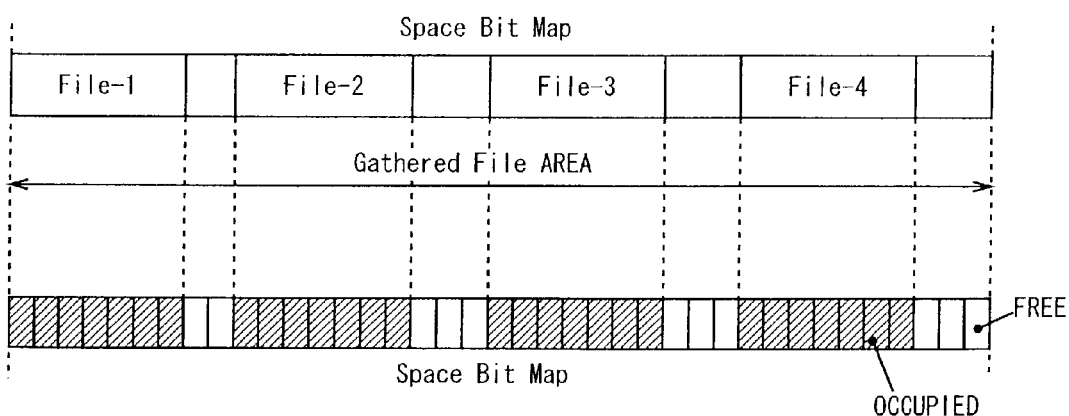
FIG. 33 is a drawing explaining Space Bit Map.

When File-1 to File-4 has been recorded in Gathered File area as shown in FIG. 33, for example, information about what the recording area for a file has been occupied is recorded in each area (bit) of preset fixed size.

Referring to FIG. 33, shadowed areas indicate the occupied areas while non-shadowed areas indicate the free areas.

Therefore, it is possible to detect continuous free areas in Gathered File area based on this Space Bit Map.

Figure 31:
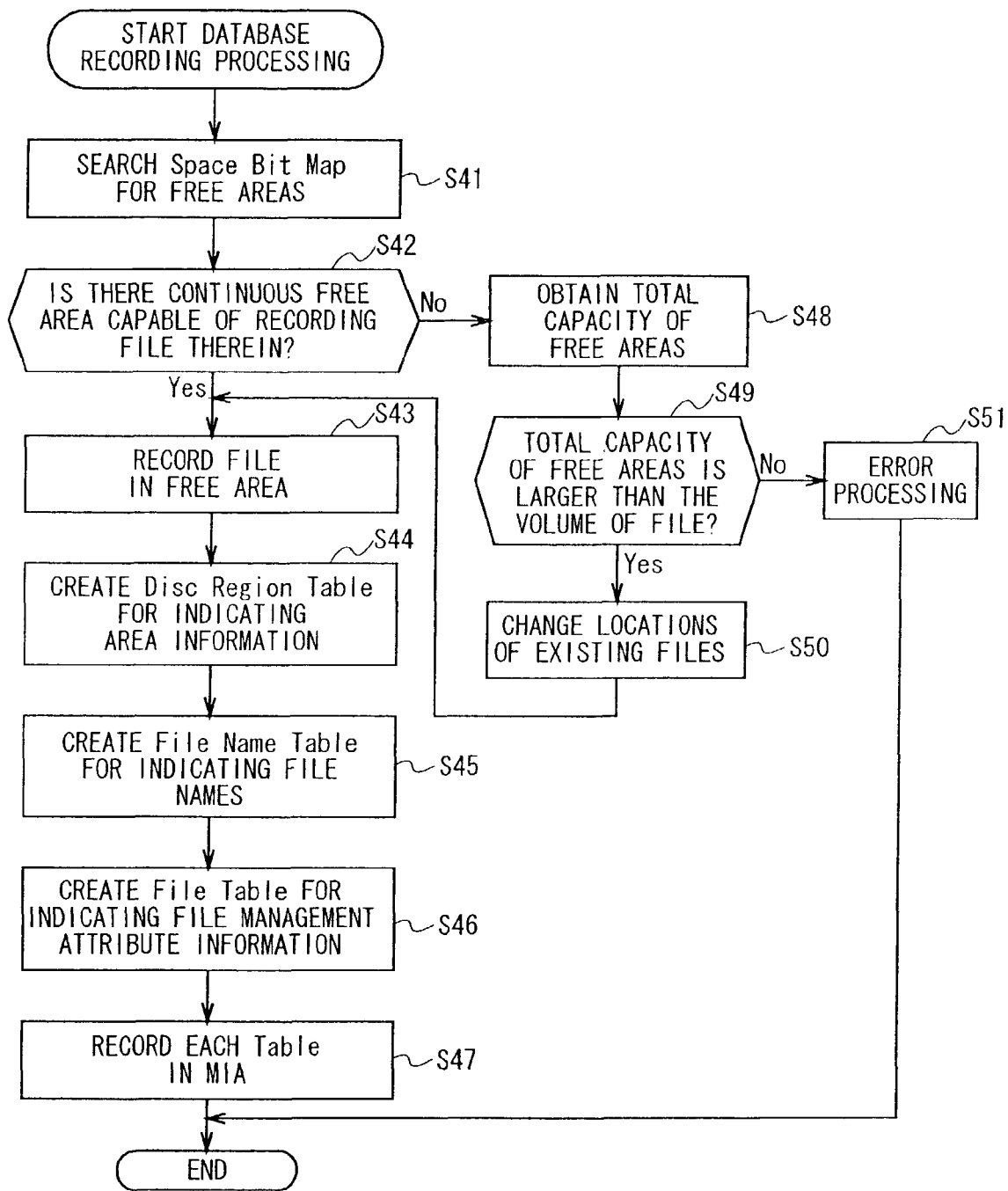
FIG. 31 is a flowchart explaining database recording processing of step S13 of FIG. 29.

When free areas are detected in Space Bit Map at the processing of step S41 of FIG. 31, then the control unit 17 judges at step S42 whether a continuous free area capable of recording a file to be recorded therein exists in Gathered File area.

When there is no continuous free areas capable of recording the file therein, then the control unit 17 moves to step S48 to calculate the total capacity of the free areas. Then, at step S49, the control unit 17 judges whether the total capacity of the free areas obtained by the calculation at step S48 is larger than the volume of the file to be recorded. When the total capacity of the free areas is larger than the volume of the file, the control unit 17 moves to step S50 to execute the processing of changing the locations of the files in Gathered File area.

Figure 34:
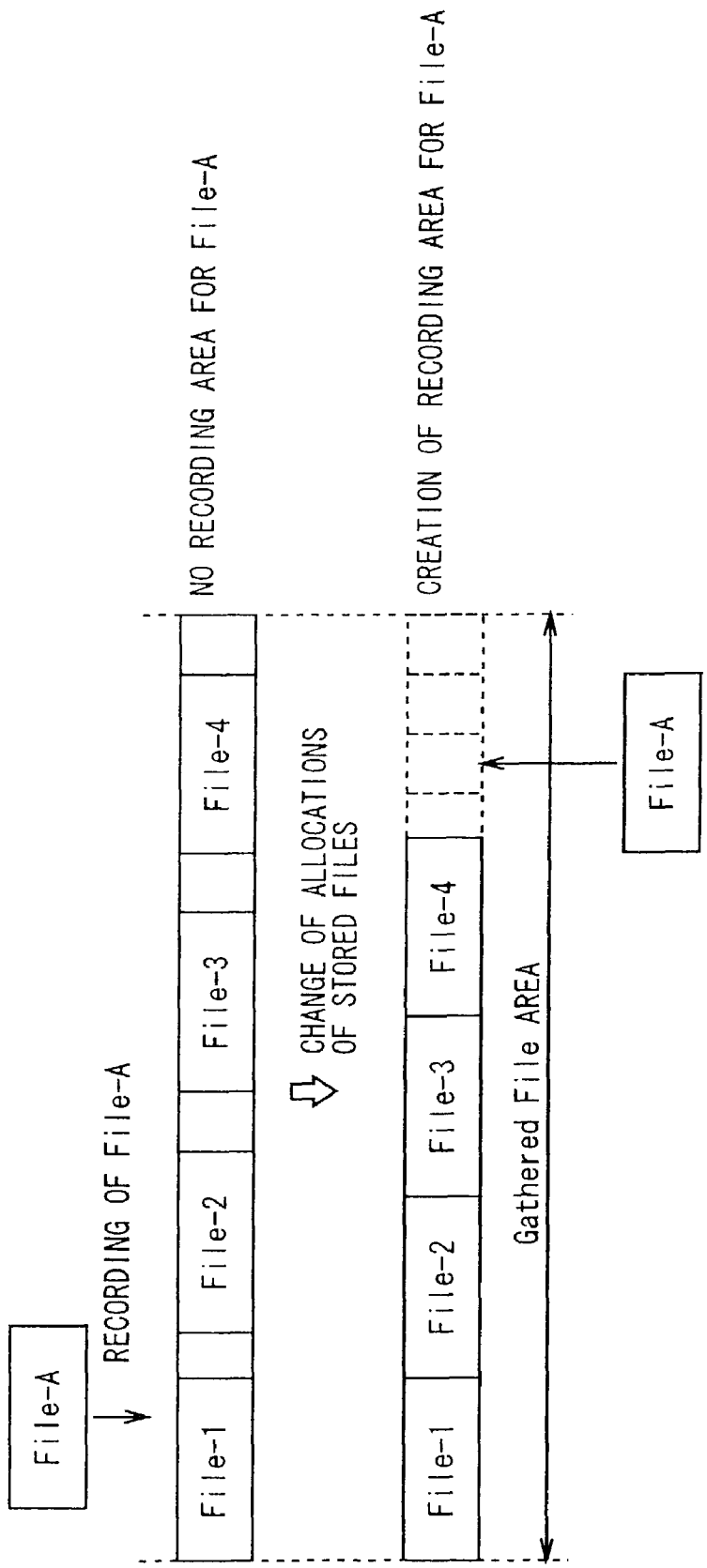
FIG. 34 is a drawing explaining the change of locations of files in Gathered File area.

For example, as shown in FIG. 34, in the case where four files, File-1 to File-4, have been already recorded in Gathered File area and there is no continuous free areas capable of recording a new File-A therein, the areas recording File-1 to File-4 are changed so that these files are continuously recorded. Thereby, a continues free area capable of recording the File-A therein are formed.

After the processing of changing the locations of existing files at step S50 or when it is judged at step S42 that there are a continuous free area capable of recording the file therein, the control unit 17 moves to step S43 to execute the processing of recording the file. In the example of FIG. 34, this processing allows the File-A to be recorded in Gathered File area.

Because the new file has been recorded in this way, MIA information needs to be changed. The control unit 17 creates Disc Region Table (FIG. 20 and FIG. 21) for indicating area information after the new file is recorded, at step S44. At step S45, the control unit 17 creates File Name Table (FIG. 25, FIG. 26 and FIG. 27) for indicating the names of the files recorded. In addition, at step S46, the control unit 17 creates File Table (FIG. 11 and FIG. 12) for indicating the file management attribute information. These information are information which are properly stored in the storage unit 17A.

Then at step S47, the control unit 17 records the tables created with the processing of step S44 to step S46 in the MIA area (FIG. 5 and FIG. 7).

When it is judged at step S49 that the total capacity of the free areas is smaller than the volume of the file to be recorded, the control unit 17 executes the error processing at step S51 because the file can not be recorded in Gathered File area. Specifically, the control unit 17 executes such processing to output a message informing that the file can not be recorded due to a lack of capacity, as a video output, and display it on a monitor.

Next, the title display processing will be explained with reference to the flowchart of FIG. 35. This processing is executed by the control unit 17 when the recording medium 10 is inserted into the motion picture recording/reproducing apparatus 1.

Figure 36:
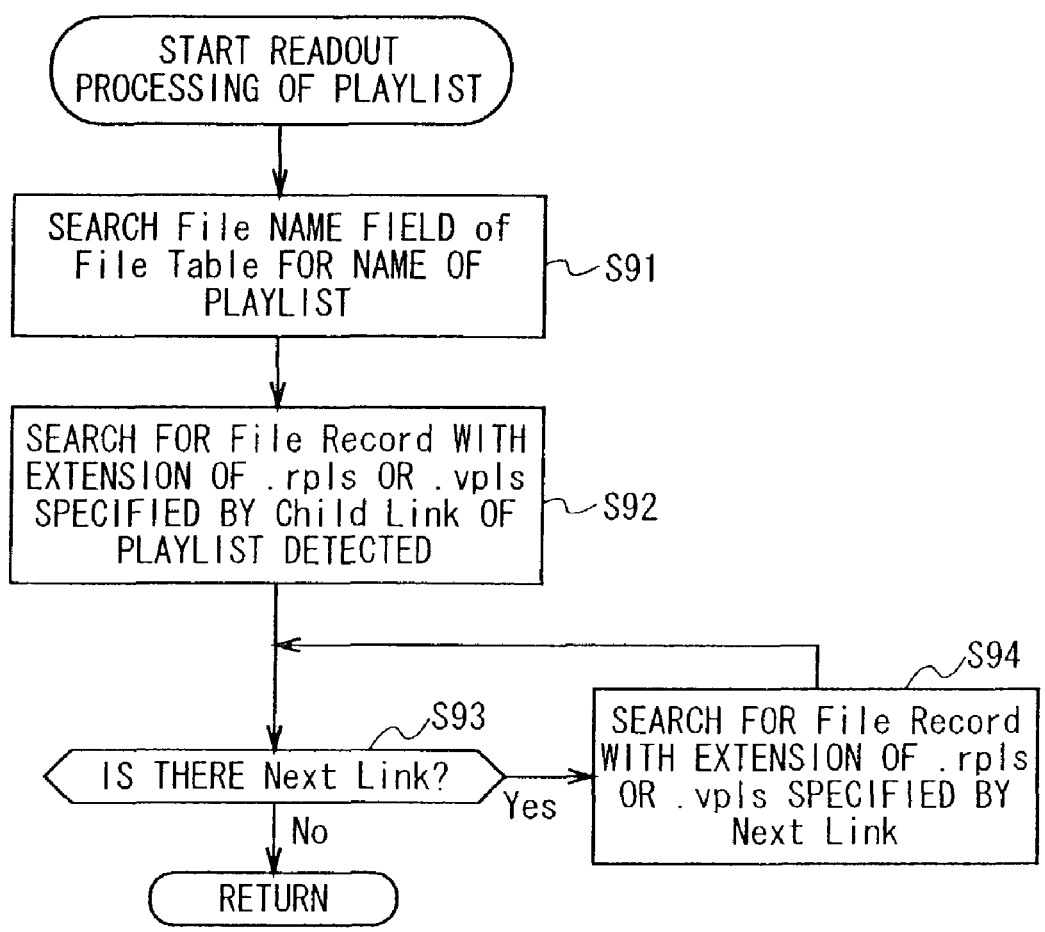
FIG. 36 is a flowchart explaining the PLAYLIST readout processing of step S71 of FIG. 35.
Figure 37:
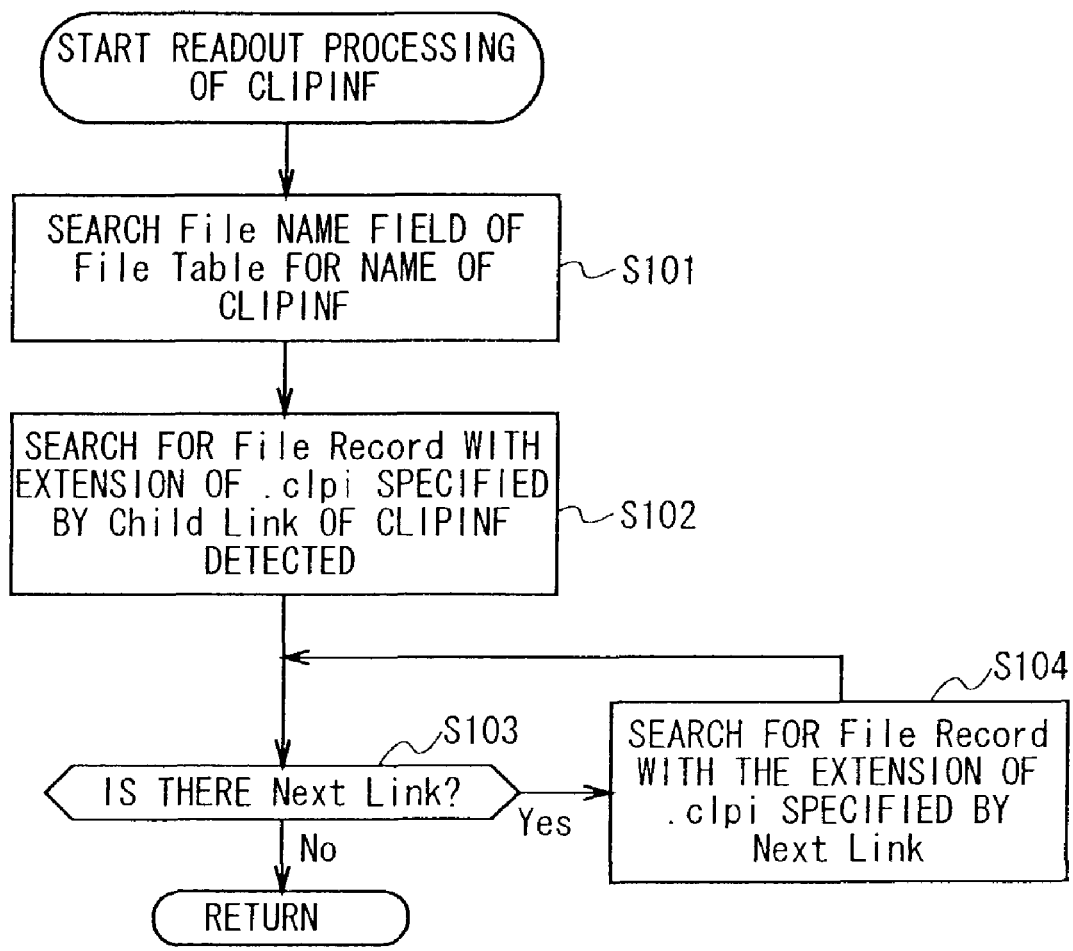
FIG. 37 is a flowchart explaining CLIPINF readout processing of step S71 of FIG. 35.

First, the readout processing of PLAYLIST and CLIPINF is executed at step S71. FIG. 36 and FIG. 37 explains this processing in detail.

First, the readout processing of PLAYLIST will be explained with reference to FIG. 36.

At step S91, the control unit 17 reads File Table (FIG. 11, FIG. 12, FIG. 16) recorded on the recording medium 10 to search the File Name field (FIG. 12) of File Table for the name of PLAYLIST. Then, at step S92, the control unit 17 searches for File Record with the extension of .rpls or .vpls which is specified by Child Link (FIG. 16) of PLAYLIST detected with the processing of step S91.

Next, the control unit 17 moves to step S93 to judge whether Next Link (FIG. 12) exists. When it exists, the control unit 17 moves to step S94 to search for File Record with the extension of .rpls or .vpls specified by Next Link. Then the control unit 17 returns to step S93 to repeatedly execute this processing.

Then, when it is judged at step S93 that Next Link does not exist, the processing is completed.

In this way, files with *.rpls or *.vpls are all read from PLAYLIST.

Next, with reference to FIG. 37, the readout processing of CLIPINF will be explained. At step S101, the control unit 17 searches File Name field (FIG. 12) of File Table (FIG. 11, FIG. 12, FIG. 16) for the name of CLIPINF.

At step S102, the control unit 17 searches for File Record with the extension of clpi which is specified by Child Link of CLIPINF detected with the processing of step S101.

Next, the control unit 17 judges at step S103 whether Next Link exists, and when it exists, then it moves to step S104 to search for File Record with the extension of .clpi which is specified by Next Link. Then, the control unit 17 returns to step S103 to repeatedly execute this processing.

When it is judged at step S103 that Next Link does not exist, the processing is completed.

In this way, files with *.clpi of CLIPINF are all read.

Figure 35:
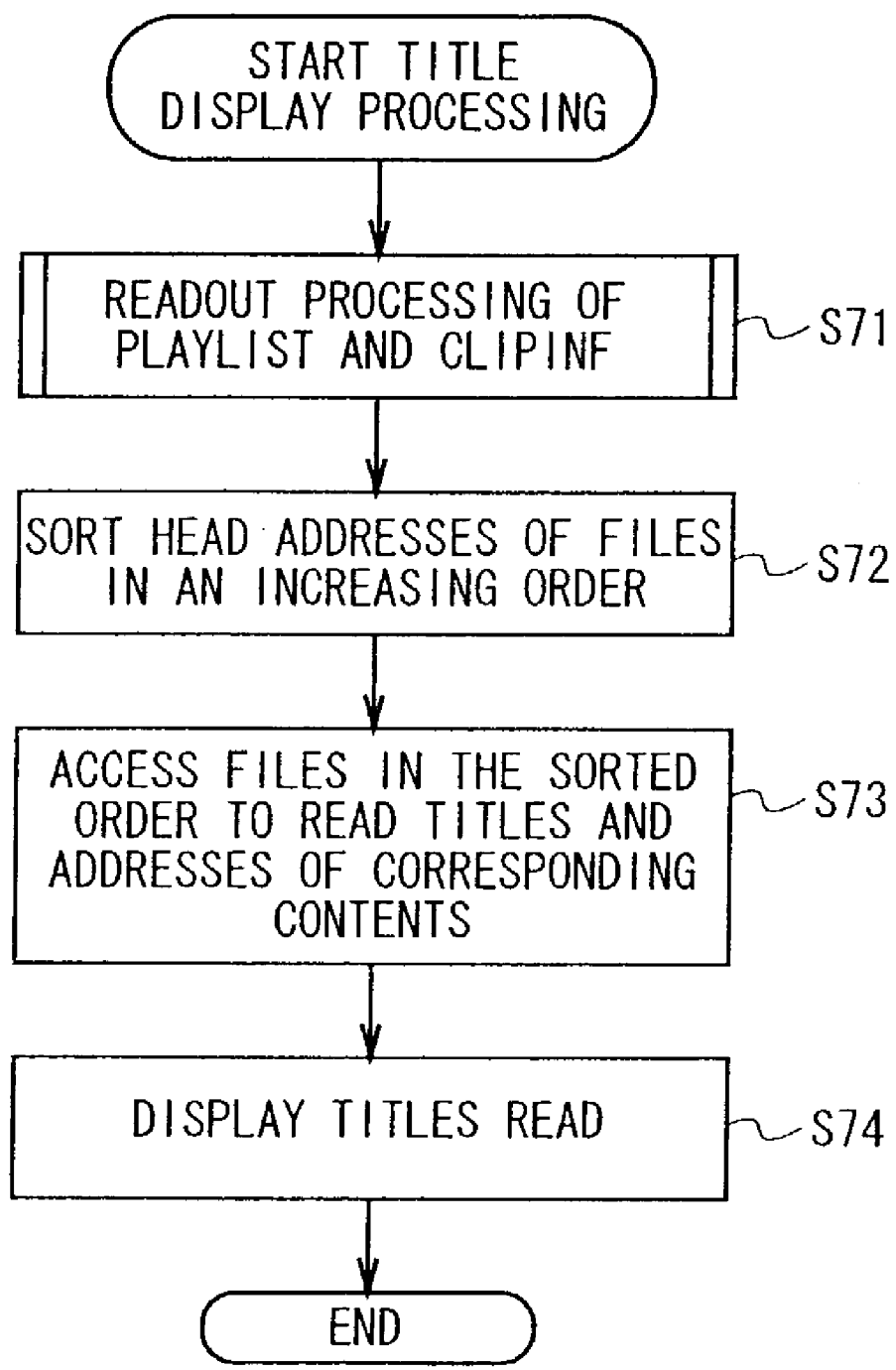
FIG. 35 is a flowchart explaining title display processing of the motion picture recording/reproducing apparatus of FIG. 28.

When the processing of step S71 of FIG. 35 is completed as described above, the control unit 17 moves to step S72 to sort the head addresses of the files read out with the processing of step S71, in an increasing order.

For example, in the case where the head addresses of File 1, File 2 and File 3 are A23, A21 an A25, respectively, as shown in FIG. 38, and if A21<A23<A25, the processing of step S72 sorts the files in the order of File 2, File 1, and File 3 in an increasing order of the head addresses as shown in FIG. 39.

Next, at step S73, the control unit 17 accesses the files in Gathered File area in the sorted order to read out the titles and addresses of corresponding contents recorded therein. The titles are read out from the files of PLAYLIST and the addresses are read out from the files of CLIPINF.

Next, at step S74, the control unit 17 generates video data corresponding to the titles read out by the processing of step S73, and outputs it to the AV decoder 16 to make it outputted from the terminal 18. Thereby, the titles of the contents recorded on the recording medium 10 are displayed. As a result, the user can select and designate a title which he wants to reproduce.

Figure 40:
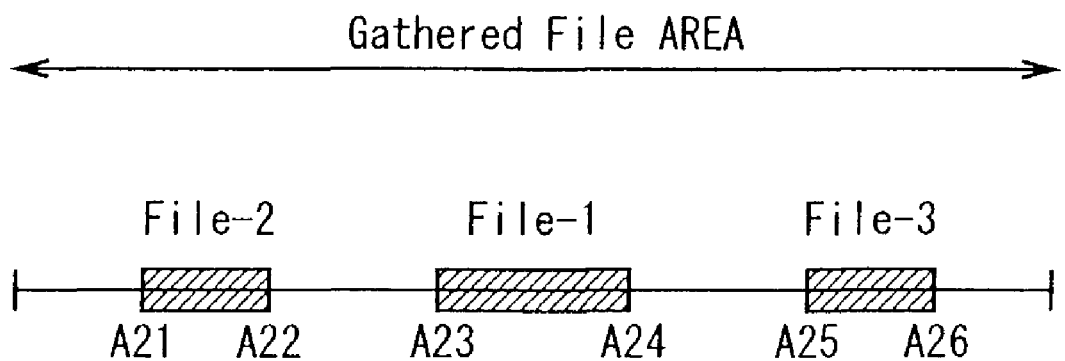
FIG. 40 is a drawing explaining recording positions of files in Gathered File area.

As described above, the files are read out in the order of File 2, File 1, File 3 which is the order of addresses as shown in FIG. 40, even the order of the detected files recorded in Gathered File area is File 1, File 2, File 3. Therefore, time for a seek operation from readout of one file till readout of a next file can be shortened as compared with the case of reading out the files in the order of File 1, File 2, File 3. As a result, a time for reading out all files can be shortened.

Figure 41:
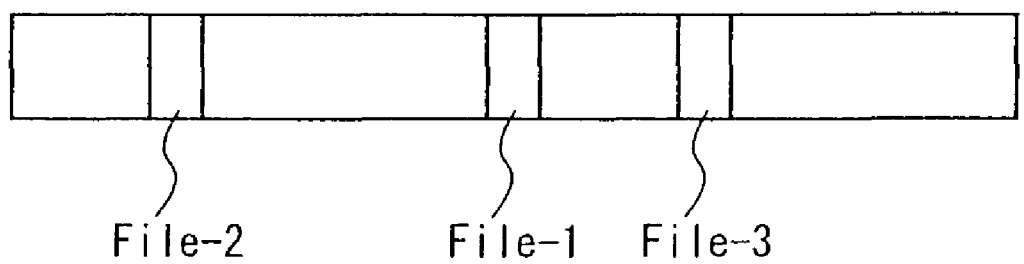
FIG. 41 is a drawing explaining recording positions of files on a recording medium.

In addition, in this system, files of information including titles are collectively recorded in a prescribed area, Gathered File area, on the recording medium 10. Therefore, files can be speedily read out as compared with the case where File 1 to File 3 are recorded in different areas on the recording medium 10 as shown in FIG. 41.

As described above, a file storing the titles of contents and a file storing the addresses which indicate the recording positions of the contents are recorded as File 1 to File 3 in Gathered File area (area between address A3 and address A4, in this case) as shown in FIG. 4.

Next, another embodiment of this invention will be explained with reference to the attached drawings.

Figure 42:
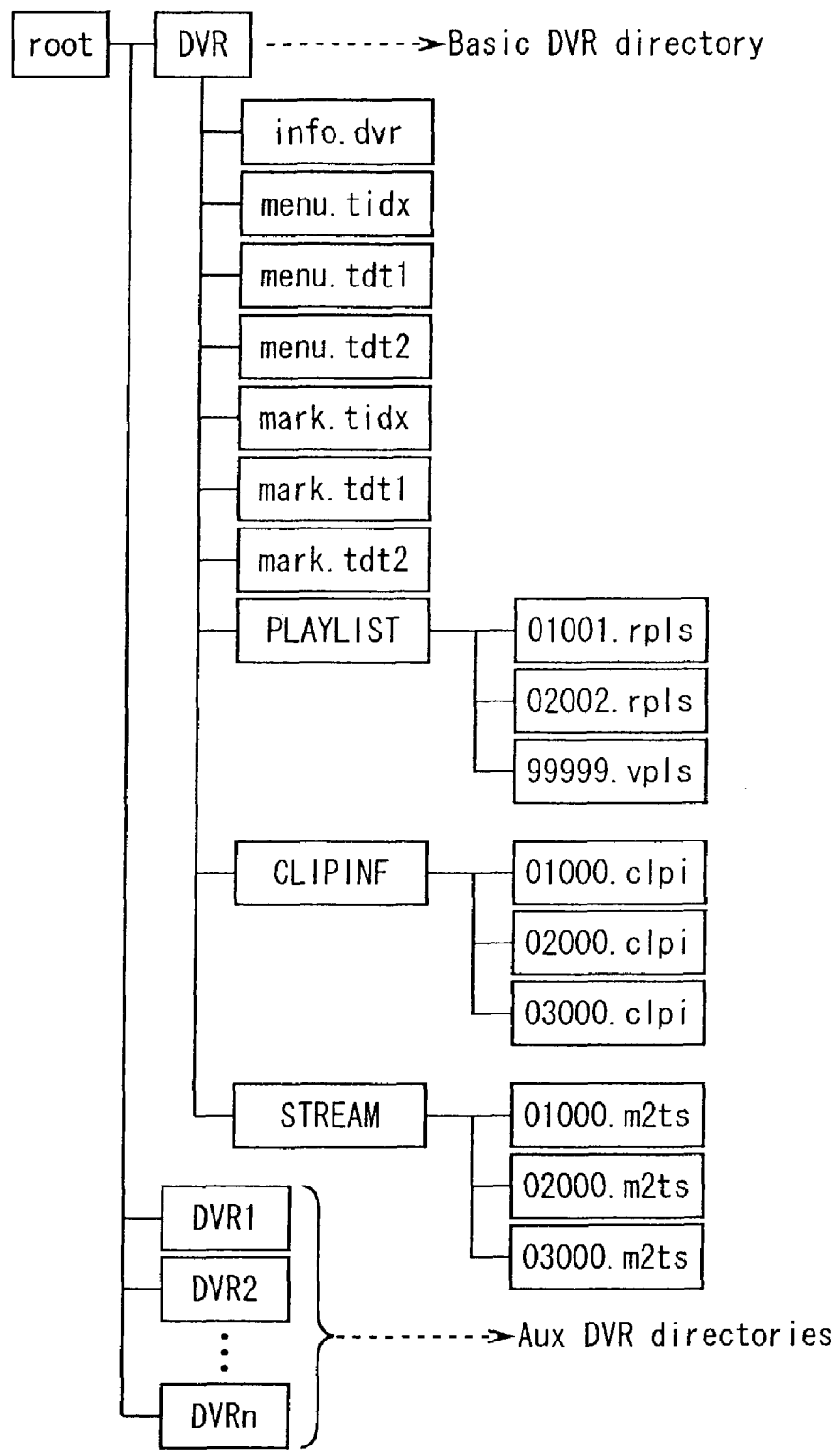
FIG. 42 is a drawing showing another example (of the directory structure.

FIG. 42 shows an example of a directory structure on the DVR disc which is different from an example of FIG. 2. As shown in FIG. 42, a root directory always includes one DVR directory, and may optionally include at least one DVRn (n is an integral number more than zero) directory. The DVR directory is called Basic DVR directory and the DVRn directories are called AUX DVR directories. Files and directories of FIG. 42 which have the same names as those shown in FIG. 2 have the same meanings as them.

Three files of menu.tidx, menu.tdt1 and menu.tdt2 in FIG. 42 are files for managing thumbnail pictures each of which is created from the main picture of each PlayList. menu.tidx is a file for storing header information of the thumbnail pictures. menu.tdt1 and menu.tdt2 are files for storing-picture information of the thumbnail pictures. Three files of mark.tidx, mark.tdt1 and mark.tdt2 are files for managing thumbnail pictures which are created from pictures of mark points selected by the user from each PlayList and of feature points extracted from the AV stream. mark.tidx is a file for storing header information of the thumbnail pictures. mark.tdt1 and mark.tdt2 are files for storing picture information of the thumbnail pictures.

Similar to the explanations for FIG. 12, FIG. 18 and FIG. 19, the file system used in the information processing apparatus of this embodiment provides "Allocation class" as attribute information relating to the location (Allocation) on the recording medium of a file. Allocation class is information which is given for each file, and this information is stored in management data of file (MIA (Management Information Area)) (refer to the explanation of FIG. 18).

FIG. 43 shows the relationship between DVR application file and its Allocation Class. Six kinds of groups: Group-1 files, Group-2 files, Group-3 files, Group-4 files, Real-time files, Data files, are provided as an example of the DVR application. That is, in this example, four groups of Group-1 to Group-4 are used as Allocation Class, instead of Gathered files in the example of FIG. 19.

Further, similar to the aforementioned explanations of FIG. 12 and FIG. 18, the file system used in the information processing apparatus of this embodiment provides Robust bit in "Attribute" field as attribute information relating to the location (Allocation) of a file on the recording medium. The Attribute field is information given to each file and this information is stored in the management data of file (MIA) (refer to FIG. 12). As to such file that Robust bit in "Attribute" field is 1, the same file data is recorded at two different positions on the recording medium to secure the reliable property. One data is called Main File Data and the other data is called Reserve File Data. Files with Robust bit of 1 in "Attribute" field shown in FIG. 43 are recorded in this way.

Figure 44:
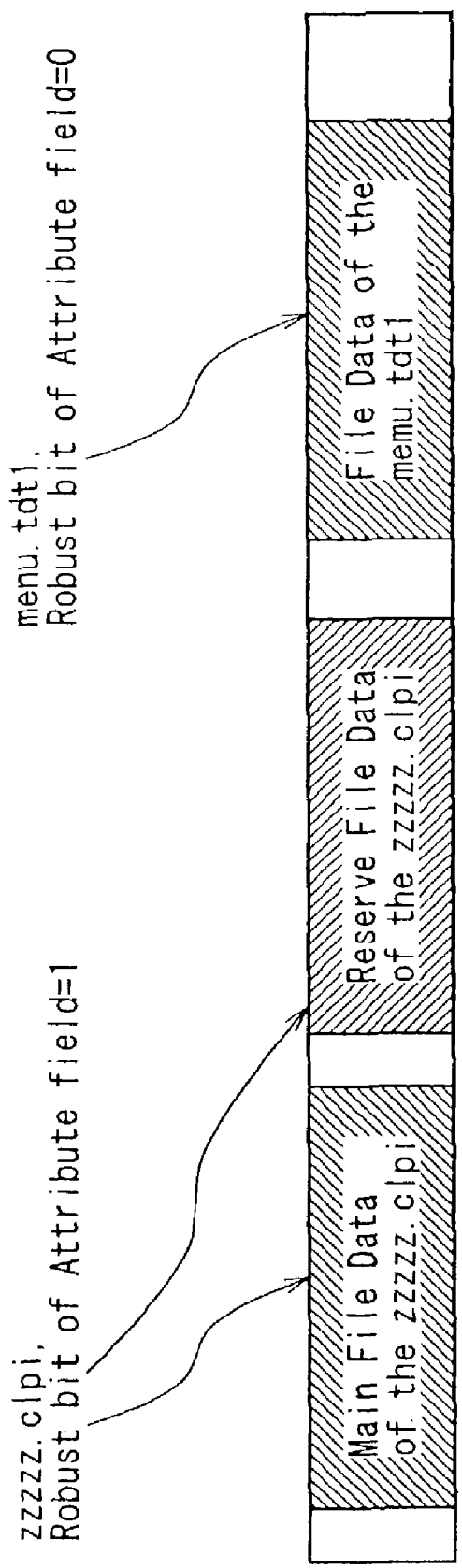
FIG. 44 is a drawing explaining the arrangement method of a file having Robust bit of one.

FIG. 44 is a diagram which explains a recording method of a file with Robust bit of 1 in Attribute field. zzzzz.clpi file has the Robust bit of 1 and also the file data is arranged (recorded) in two areas as Main File Data and Reserve File Data. The Reserve File Data has the same information as Main File Data. In the case of recording a file, recording is performed in the order of Main data and then Reserve data. And in the case of reproducing the file, Main data is firstly read. If Main File Data can not be read due to a data error, Reserve File Data is read.

As to such file that Robust bit in "Attribute" field is 0, its data is recorded at one position on the recording medium. menu.tdt1 file shown in FIG. 44 has Robust bit of 0 in Attribute field, and its file data is recorded in one area.

Figure 45:
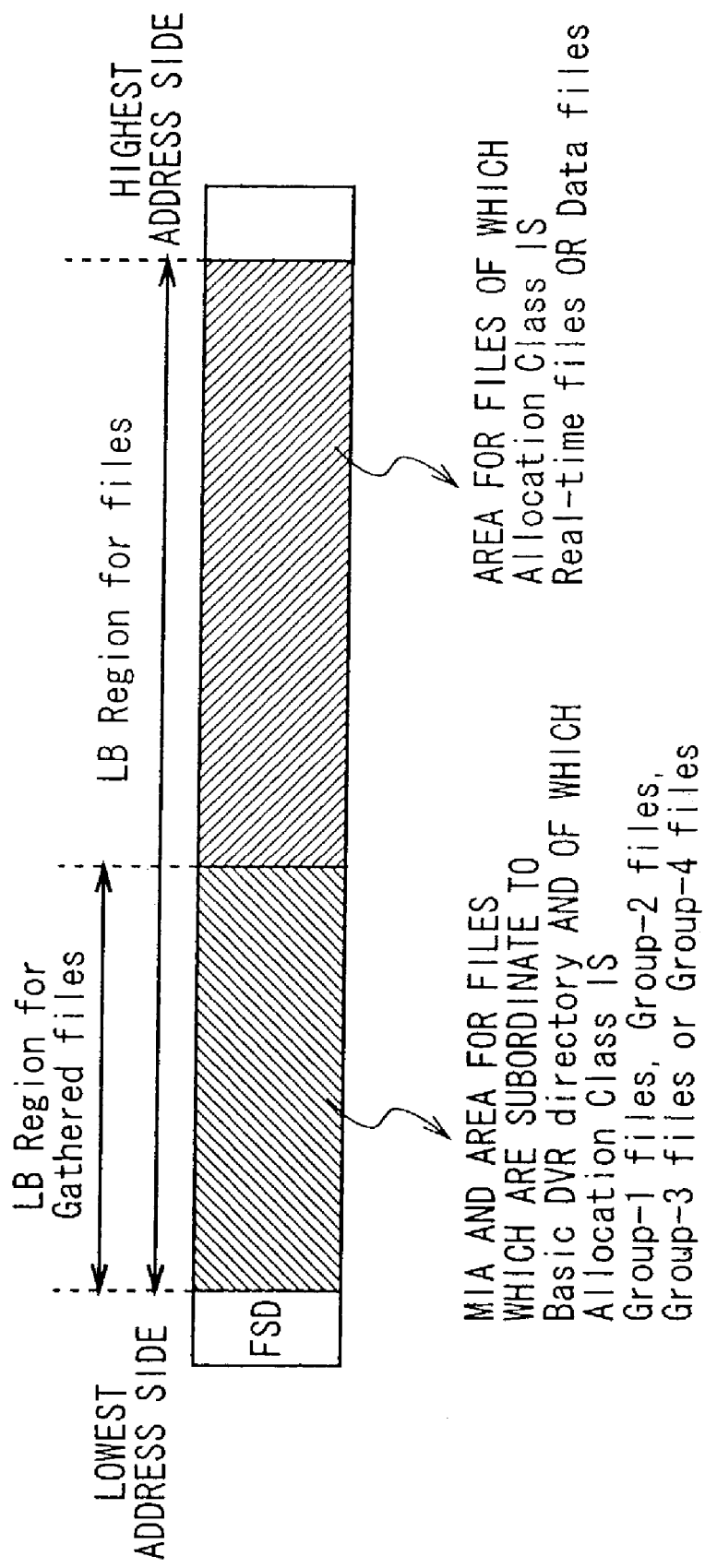
FIG. 45 is a diagram explaining an arrangement example of LB Region for files and LB Region for Gathered files in volume space.
Figure 46:
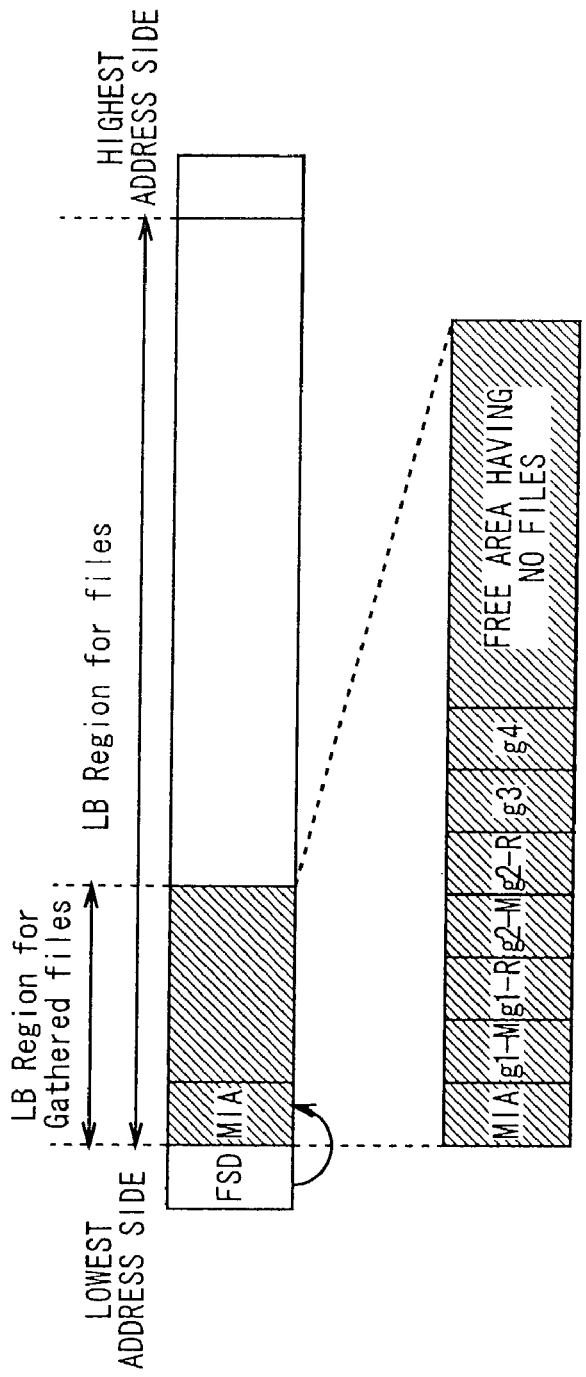
FIG. 46 is a diagram showing an arrangement example of File Data in LB Region for Gathered files.

In the file system used in the information processing apparatus of this embodiment, the file data of files of which Allocation Class are Group-1 files, Group-2 files, Group-3 files or Group-4 files are collectively recorded in a prescribed area called LB (Logical Block) Region for Gathered files (Gathered files area) as shown in FIG. 45. The locations (start address and end address) of LB Region for files and LB Region for Gathered files on the recording medium shown in FIG. 45 are recorded in Parameters of Allocation Rule Set Record (FIG. 23). In addition, as shown in FIG. 46, the following six areas are specified in LB Region for Gathered files.

(1) Main LB Regions for Group-1 files (area for storing Main File Data of a file of which AC (Allocation Class) is Group-1 files, and this area is shown by g1-M in this figure) (2) Reserve LB Region for Group-1 files (area for storing Reserve File Data of a file of which AC is Group-1 files, and this area is shown by g1-R in this figure) (3) Main LB Regions for Group-2 files (area for storing Main File Data of a file of which AC is Group-2 files, and this area is shown by g2-M in this figure) (4) Reserve LB Region for Group-2 files (area for storing Reserve File Data of a file of which AC is Group-2 files, and this area is shown by g2-R in this figure) (5) LB Regions for Group-3 files (area for storing File Data of a file of which AC is Group-3 files, and this area is shown by g3 in this figure) (6) LB Region for Group-4 files (area for storing File Data of a file of which AC is Group-4 files, and this area is shown by g4 in this figure)

The locations (start address and end address) of these six areas on the recording medium are also recorded in Parameters of Allocation Rule Set Record (FIG. 23).

For example, each capacity of g1-M, g1-R, g2-M and g2-R is 2 Mbytes, the capacity of g3 is 3.2 Mbytes and the capacity of g4 is 16 Mbytes. In this connection, M is 1024×1024.

Grouping of files among Group-1, Group-2, Group-3 and Group-4 is considered so that the files can be arranged in the above capacity. Further, on the contrary, the maximum size of files of each group is limited so that the files can be arranged in the above capacity.

For example, in the case of newly recording Main File Data of a file of which AC (Allocation Class) is Group-1 files, its File data is recorded in a free area of Main LB Regions for Group-1 files.

Figure 47:
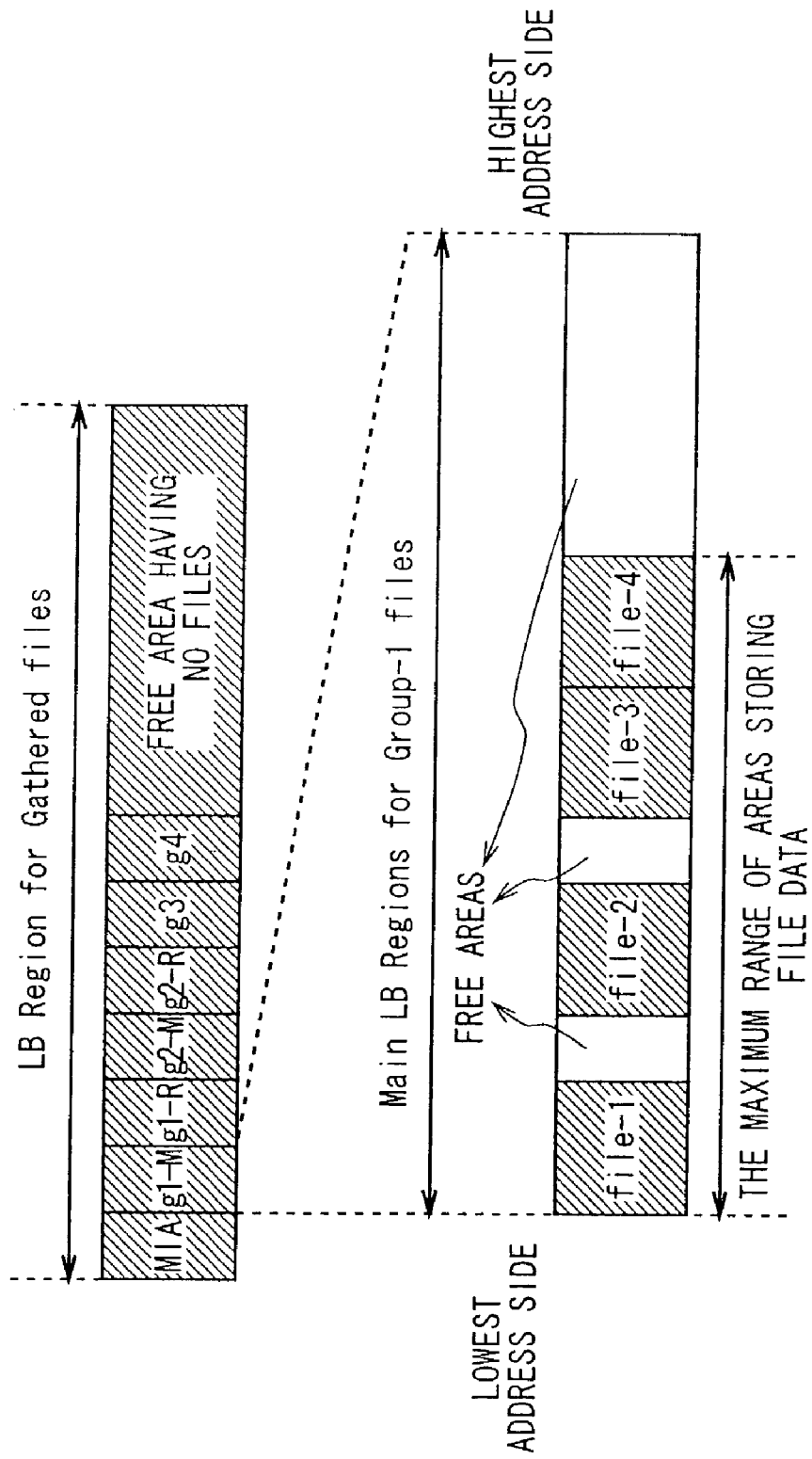
FIG. 47 is a diagram showing an arrangement example of file data in Main LB Regions for Group-1 files.

FIG. 47 shows an example of file data arranged in Main LB Region for Group-1 files. The location information of file data in Main LB Regions for Group-1 files is stored in management data of the aforementioned Disc Region Table (FIG. 20 and FIG. 21). The same processing is applied for the aforementioned (2) to (6) areas.

The (1) to (6) areas can be moved within LB Region for Gathered files. In addition, LB Region for Gathered files can be moved on the recording medium. For example, if errors increases in LB Region for Gathered files, new LB Region for Gathered files is created and its location on the recording medium is recorded in Parameters of Allocation Rule Set Record in MIA.

Figure 48:
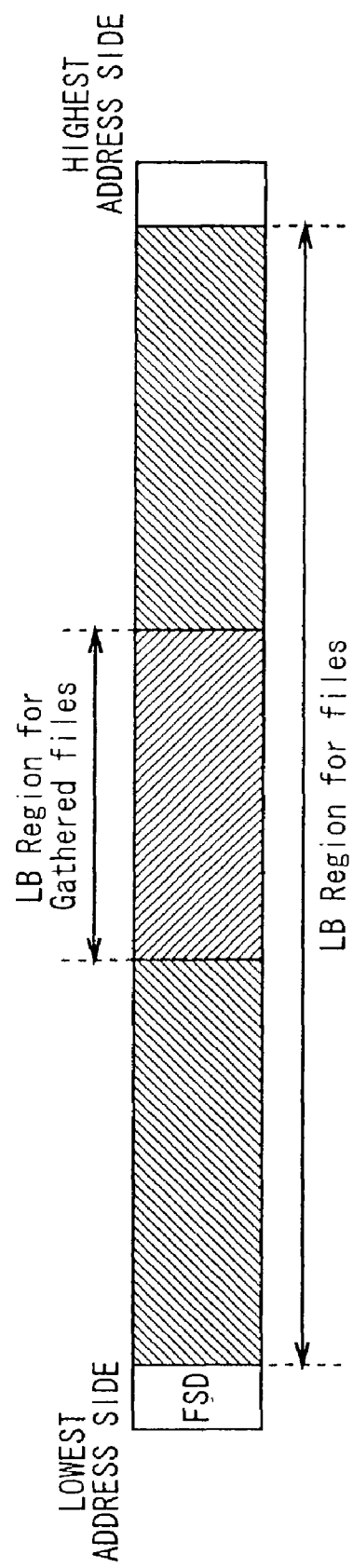
FIG. 48 is a diagram showing an example in which LB Region for Gathered files divides LB Region for files.

FIG. 48 shows an example of arranging LB Region for Gathered files at a position (almost in the center, in this figure) away from the inner circumference of the disc. In this case, LB Region for files is divided into two.

FIG. 49 shows the syntax of information indicating the locations of LB Region for Gathered files and above (1) to (6) areas on the recording area, which is stored in Parameters of Allocation Rule Set Record (FIG. 23). This information is called Allocation Info of DVR files.

LB Region for Gathered files (RBP0) indicates the start position and end position of LB Region for Gathered files on the recording medium with Start Logical Block Number and End Logical Block Number shown in FIG. 50.

Main LB Regions for Group-1 files (RBP16) indicates the start position and end position of Main LB Regions for Group-1 files on the recording medium with the syntax shown in FIG. 50. Reserve LB Regions for Group-1 files (RBP24) indicates the start position and end position of Reserve LB Regions for Group-1 files on the recording medium with the syntax shown in FIG. 50.

Main LB Regions for Group-2 files (RBP32) indicates the start position and end position of Main LB Regions for Group-2 files on the recording medium with the syntax shown in FIG. 50. Reserve LB Regions for Group-2 files (RBP40) indicates the start position and end position of Reserve LB Regions for Group-2 files on the recording medium with the syntax shown in FIG. 50.

LB Regions for Group-3 files (RBP48) indicates the start position and end position of LB Regions for Group-3 files on the recording medium with the syntax shown in FIG. 50.

LB Regions for Group-4 files (RBP56) indicates the start position and end position of LB Region for Group-4 files on the recording medium with the syntax shown in FIG. 50.

Main LB Regions for Group-1 files, Reserve LB Regions for Group-1 files, Main LB Regions for Group-2 files, Reserve LB Regions for Group2 files, LB Regions for Group-3 files and LB Regions for Group-4 files are included in LB Regions for Gathered files.

Figure 51:
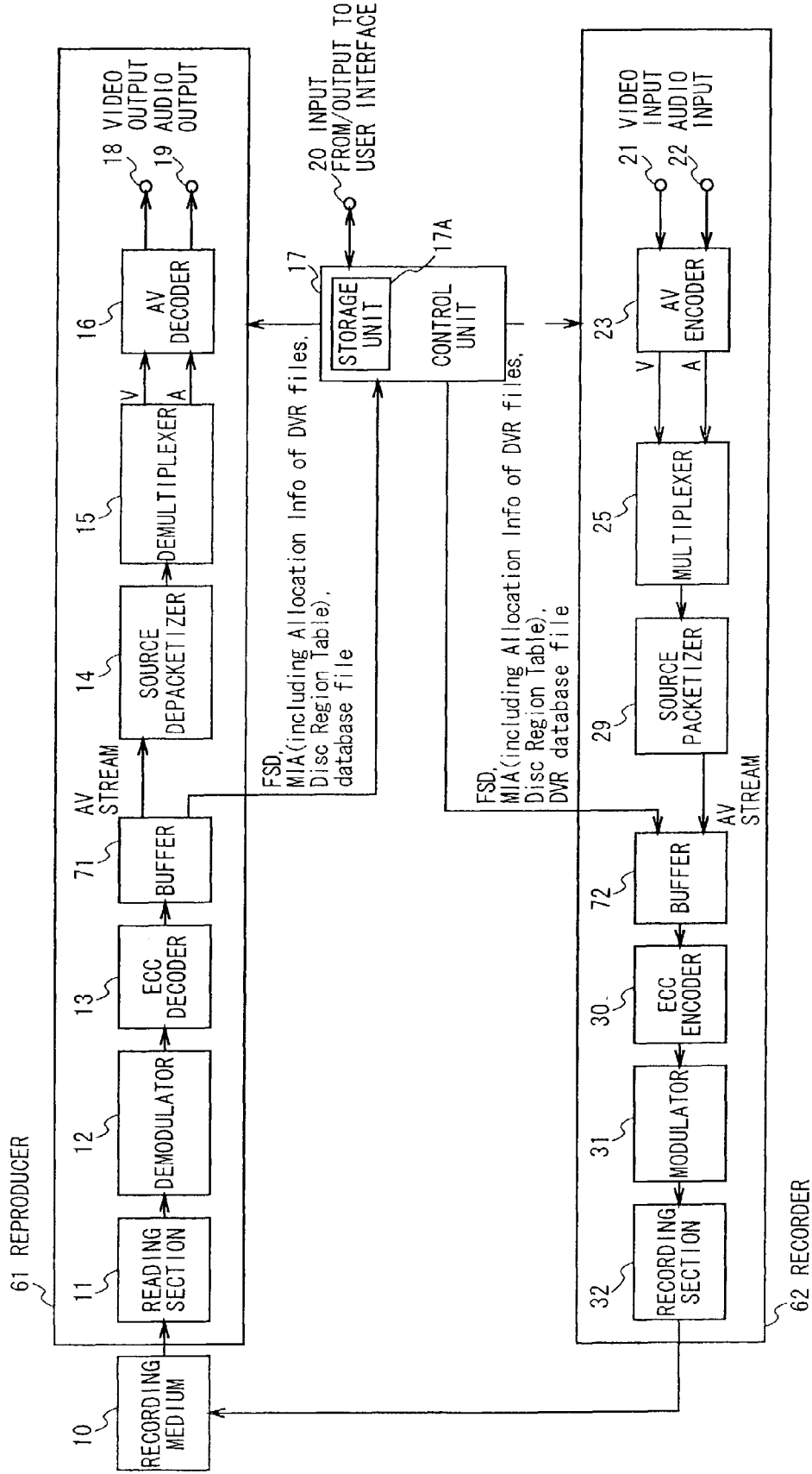
FIG. 51 is a block diagram showing another structure of a motion picture recording/reproducing apparatus to which this invention is applied.

Next, the system for recording/reproducing data having such DVR application structure will be explained with reference to the block diagram of the motion picture recording/reproducing apparatus of FIG. 51. The motion picture recording/reproducing apparatus 1 of FIG. 51 has basically the same structure as the motion picture recording/reproducing apparatus 1 of FIG. 28. In the motion picture recording/reproducing apparatus 1 of FIG. 51, however, the outputs of the ECC decoder 13 is inputted to the source depacketizer 14 or control unit 17 via the buffer 71. In addition, the outputs of the control unit 17 and the source packetizer 29 are supplied to the ECC encoder 30 via the buffer 72.

Figure 28:
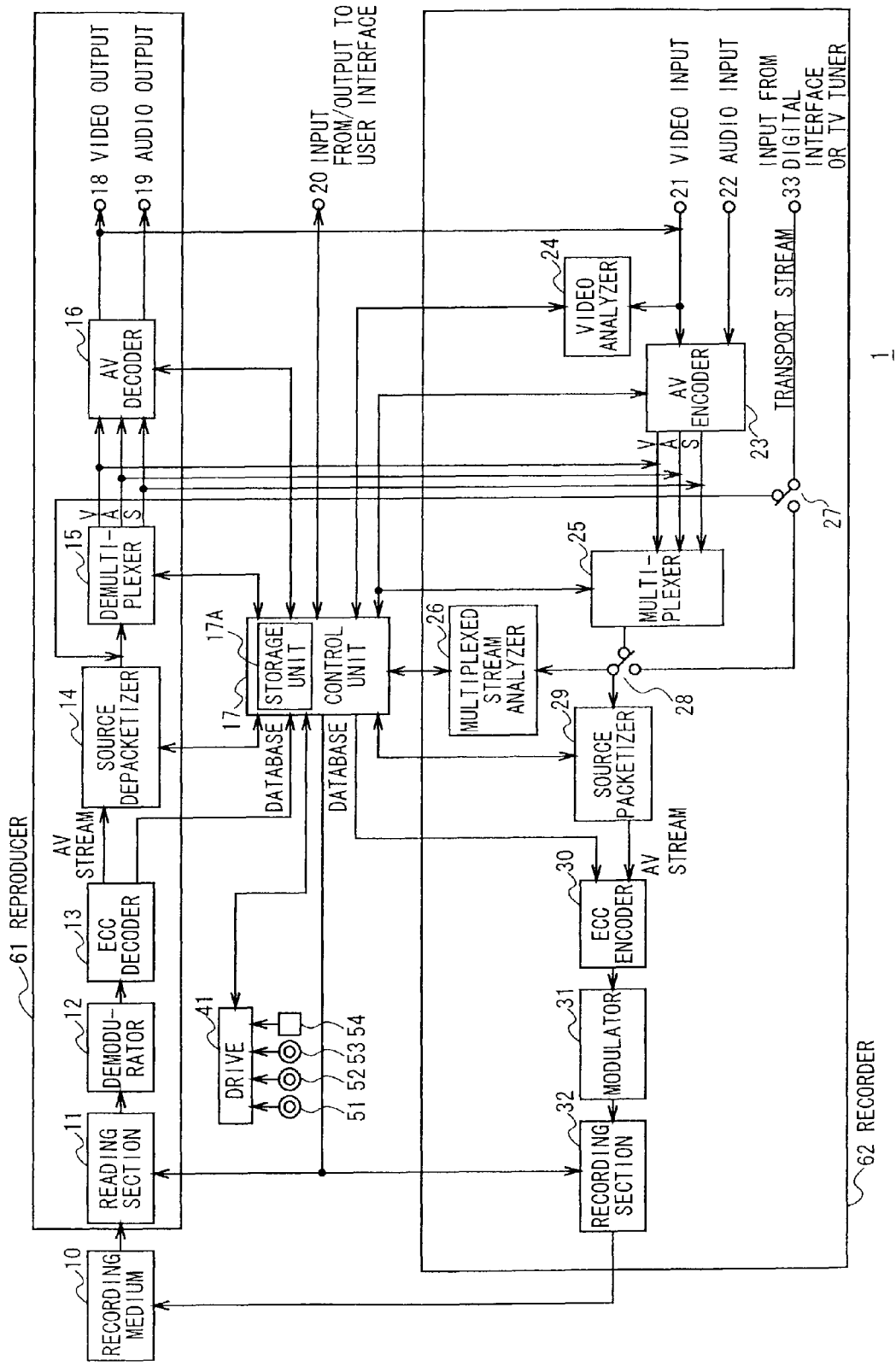
FIG. 28 is a block diagram showing the structure of a motion picture recording/reproducing apparatus to which this invention is applied.

Note that, the video analyzer 24, multiplexed stream analyzer 26, switches 27 and 28 in FIG. 28 are omitted in this figure.

First, as to a recording operation, the case of encoding and recording the inputted audio video signal will be explained.

Before recording, the control unit 17 firstly instructs the reading section 11 to read data of File System Descriptor (FSD) (FIG. 6). The reading section 11 reads data of FSD (FIG. 4 and FIG. 5) recorded at a predetermined location on the recording medium 10, and the data is processed through the demodulator 12 and ECC decoder 13 and inputted to the control unit 17 via the buffer 71. The control unit 17 obtains the address of MIA based on the FSD data.

Then, the control unit 17 instructs the reading section 11 to read MIA. The reading section 11 reads the data of MIA, and the data is processed through the demodulator 12 and ECC decoder 13 and inputted to the control unit 17 via the buffer 71. The control unit 17 obtains the data of Allocation Info of DVR files (FIG. 49) in MIA. And it obtains information about free areas on the recording medium by analyzing the data of Disc Region Table (FIG. 10, FIG. 20 and FIG. 21).

The video signal and audio signal are inputted from the terminals 21 and 22, respectively. The video signal and audio signal are inputted to the AV encoder 23. The AV encoder 23 encodes the inputted video signal and audio signal to output the encoded video stream (V), encoded audio stream (A) to the multiplexer 25. The encoded video stream (V) is, for example, an MPEG2 video stream, and the encoded audio stream (A) is, for example, an MPEG1 audio stream or Dolby AC3 (trademark) audio steam. The multiplexer 25 multiplexes the inputted streams to output a multiplexed stream.

The multiplexed stream is, for example, an MPEG2 transport stream or MPEG2 program stream. The multiplexed stream is inputted to the source packetizer 29. The source packetizer 29 encodes the inputted multiplexed stream in accordance with the application format of the recording medium to generate an AV stream composed of source packets. The AV stream is processed through the ECC encoder 30, modulator 31 via the buffer 72 and is inputted to the recording section 32. The recording section 32 records a Clip AV stream file on the recording medium 10 based on the control signal given from the control unit 17. The control unit 17 controls this recording so as to record the Clip AV stream in a free area other than LB Regions for Gathered files in LB Regions for files (FIG. 46).

As well as recording the Clip AV stream file, this motion picture recording/reproducing apparatus 1 records application database information relating to this file, that is, Clip Information file, PlayList file, information of thumbnail pictures, and management information (info.dvr) of the contents recorded on the recording medium 10. These application database information are created by the control unit 17. The Clip Information file and information of thumbnail pictures of marks (feature points) are created by analyzing the Clip AV stream file by the control unit 17. The PlayList file and information of menu thumbnail pictures are created by the control unit 17 based on the user-command information inputted from the terminal 20. The control unit 17 also creates the management information (info.dvr) of the recorded contents.

The application database information created by the control unit 17 is processed through the ECC encoder 30 and modulator 31 and inputted to the recording section 32, in the same way as the AV stream. The recording section 32 records the database files on the recording medium 10 based on the control signal given from the control unit 17. That is, the control unit 17 records the database files on the recording medium based on the data of the Allocation Info of DVR files and the information about the free areas on the recording medium. This processing will be explained in detail later with reference to FIG. 52 and FIG. 53.

Next, the basic operation for reproduction will be explained.

The AV stream file, application database information and file system data have been recorded on the recording medium 10.

First, the control unit 17 obtains the data of FSD to get the data of MIA, similar to the aforementioned recording operation. The control unit 17 obtains the data of Allocation Info of DVR files (FIG. 49) in MIA, and also obtains the location information of file data on the recording medium 10 by analyzing the data of Disc Region Table (FIG. 10, FIG. 20 and FIG. 21).

Next, the control unit 17 instructs the reading section 11 to read the application database information. The reading section 11 reads the application database information from the recording medium 10, and the database information is processed through the demodulator 12, FCC decoder 13 and is inputted to the control unit 17 via the buffer 71. This processing will be described in detail later with reference to FIG. 54 and FIG. 55.

The control unit 17 outputs a list of PlayLists (a list of titles) recorded on the disc to the terminal 20 serving as a user interface, on the basis of the application database. The user selects a PlayList desired to be reproduced from the list of PlayLists and then, the selected PlayList is inputted to the control unit 17. The control unit 17 instructs the reading section 11 to read the AV stream file necessary for reproducing the PlayList. Then, the reading section 11 reads the AV stream from the recording medium 10, and the AV stream is processed through the demodulator 12 and FCC decoder 13 and is inputted to the source depacketizer 14 via the buffer 71.

The source depacketizer 14 converts the AV stream of the application format of the recording medium 10 into a stream which can be inputted to the demultiplexer 15. The demultiplexer 15 inputs the video stream (V) and audio stream (A) composing the AV stream for the designated reproduction zone (PlayItem) specified by the control unit 17, to the AV decoder 16. The AV decoder 16 decodes the video stream and audio stream to output the reproduction video signal and reproduction audio signal from the terminals 18 and 19, respectively.

Figure 52:
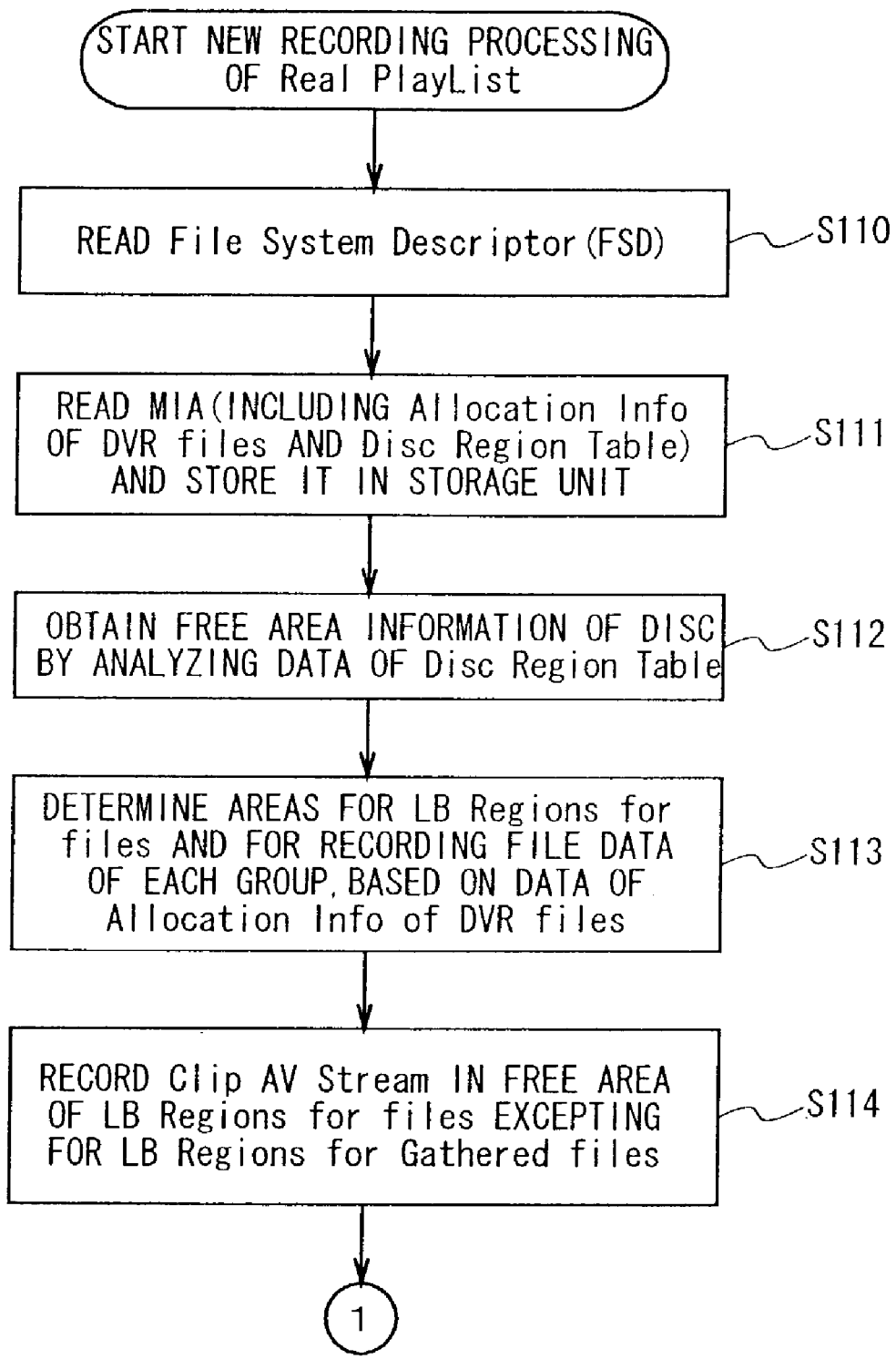
FIG. 52 is a flowchart explaining new recording processing of Real PlayList.
Figure 53:
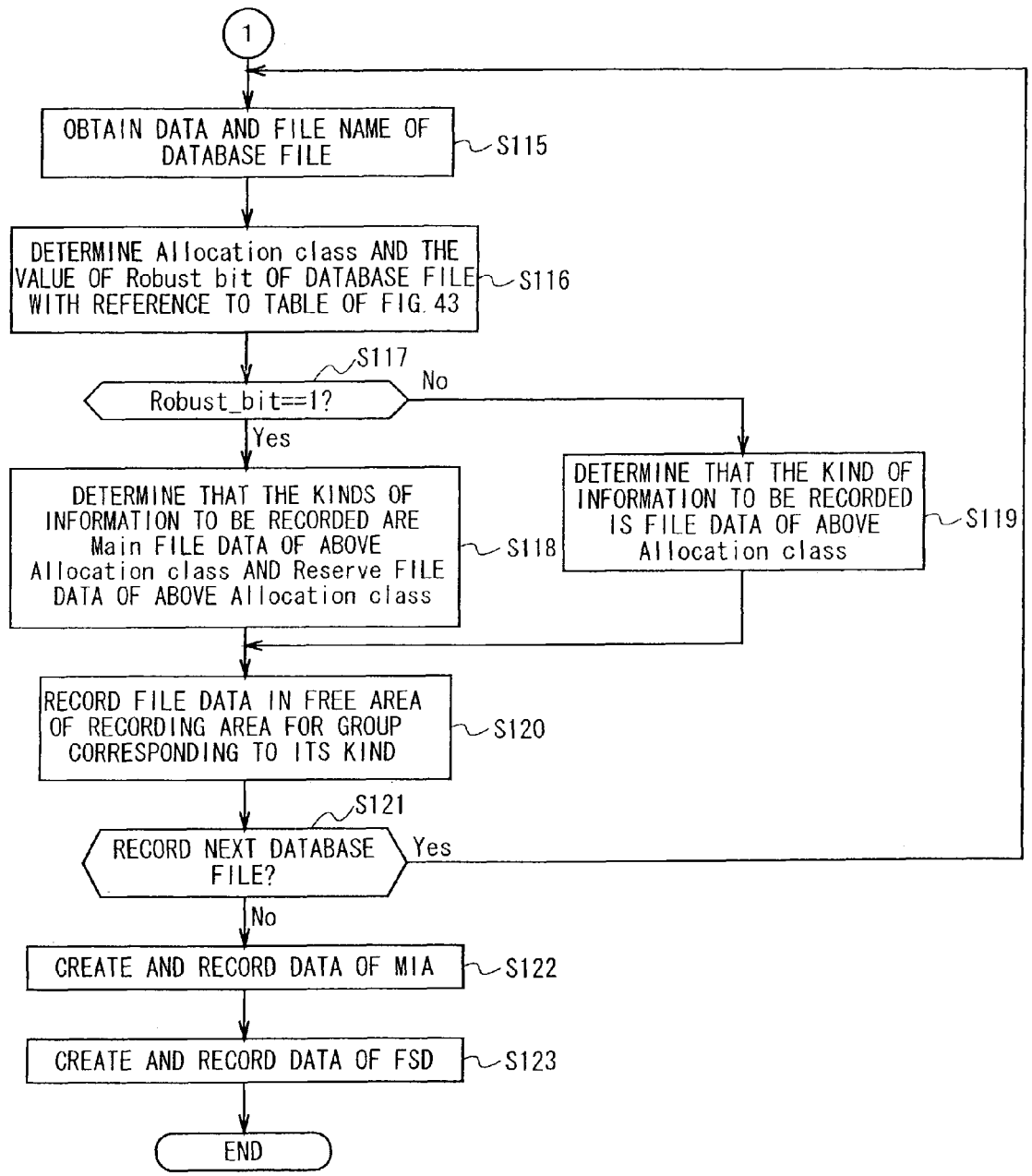
FIG. 53 is a flowchart explaining new recording processing of Real PlayList.

Next the recording processing of new Real PlayList (Clip AV stream and its database information) will be explained with reference to the flowcharts of FIG. 52 and FIG. 53.

At step S110, the control unit 17 reads FSD (File System Descriptor). At step S111, the control unit 17 reads MIA (including Allocation Info of DVR files and Disc Region Table) and stores it in the storage unit 17A.

At step S112, the control unit 17 analyzes the data of Disc Region Table to obtain information of free areas on the recording medium 10.

At step S113, the control unit 17 decides areas for LB Regions for files and for recording the file data of each group, based on the data of Allocation Info of DVR files (FIG. 49). These areas may be the same as the areas designated by Allocation Info of DVR files read, or may be not.

At step S114, the control unit 17 controls this recording so as to record the Clip AV stream in a free area of LB Regions for files excepting for LB Regions for Gathered files.

At step S115, the control unit 17 obtains the data and name of the database file.

At step S116, the control unit 17 decides Allocation class of the database file and the value of its Robust bit with reference to the table (stored in the storage unit 17A) of FIG. 43.

At step S117, it is judged whether Robust bit is 1. When Robust bit is 1, then the process moves to step S118. Since two kinds of information are recorded, it is determined that one is the Main file data of the aforementioned Allocation class and the other is the Reserve file data of the aforementioned Allocation class (that is, double recording is performed).

When it is judged at step S117 that Robust bit is 0, then the process moves to step S119. And it is determined that the kind of information to be recorded is the file data of the aforementioned Allocation class (that recording is performed once).

At step S120, the control unit 17 records the file data in the free area of the recording area for the group corresponding to that kind.

At step S121, it is judged whether there is a database file to be recorded next, and when yes, the process returns to step S115 to repeat the aforementioned processing.

When there is no database file to be recorded next, then at step S122, the control unit 17 creates the data of MIA for managing the records of file data on the recording medium 10 and records it on the recording medium 10.

At step S123, the control unit 17 creates the data of FSD which indicates the recording address of MIA and records it on the recording medium 10. And then the process is completed.

Note that, as to the recording of a database file between step S115 and step S121, only files to be newly recorded can be recorded or all files (new files and already recorded files) can be recorded again, on the recording medium. In addition, as to the recording of a database file between step S115 and step S121, Main file data is recorded and then reserve file data is recorded for each file having Robust bit of 1. However, the following processing can be performed. That is, main file data of all files having the same Allocation class is firstly recorded and then, reserve file data of all files having its Allocation class is recorded.

Figure 54:
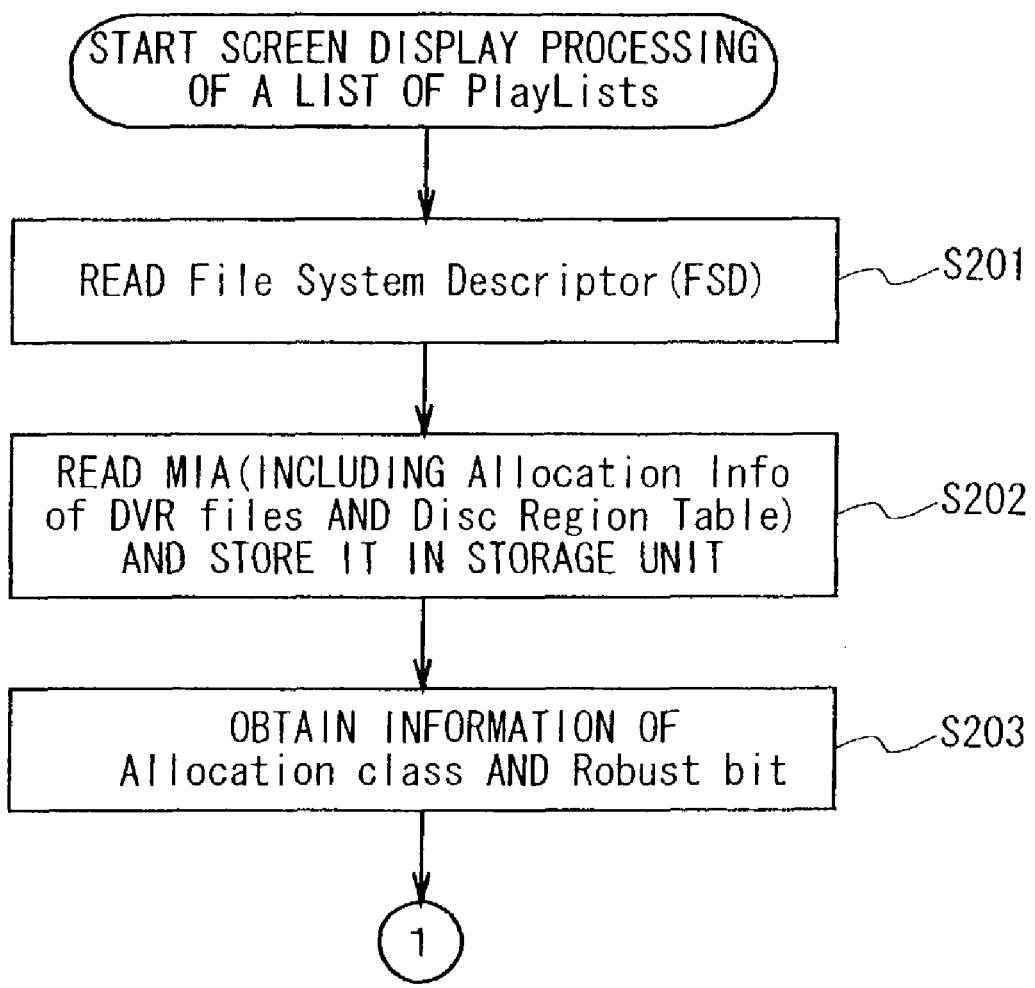
FIG. 54 is a flowchart explaining screen display processing of a list of PlayLists.
Figure 55:
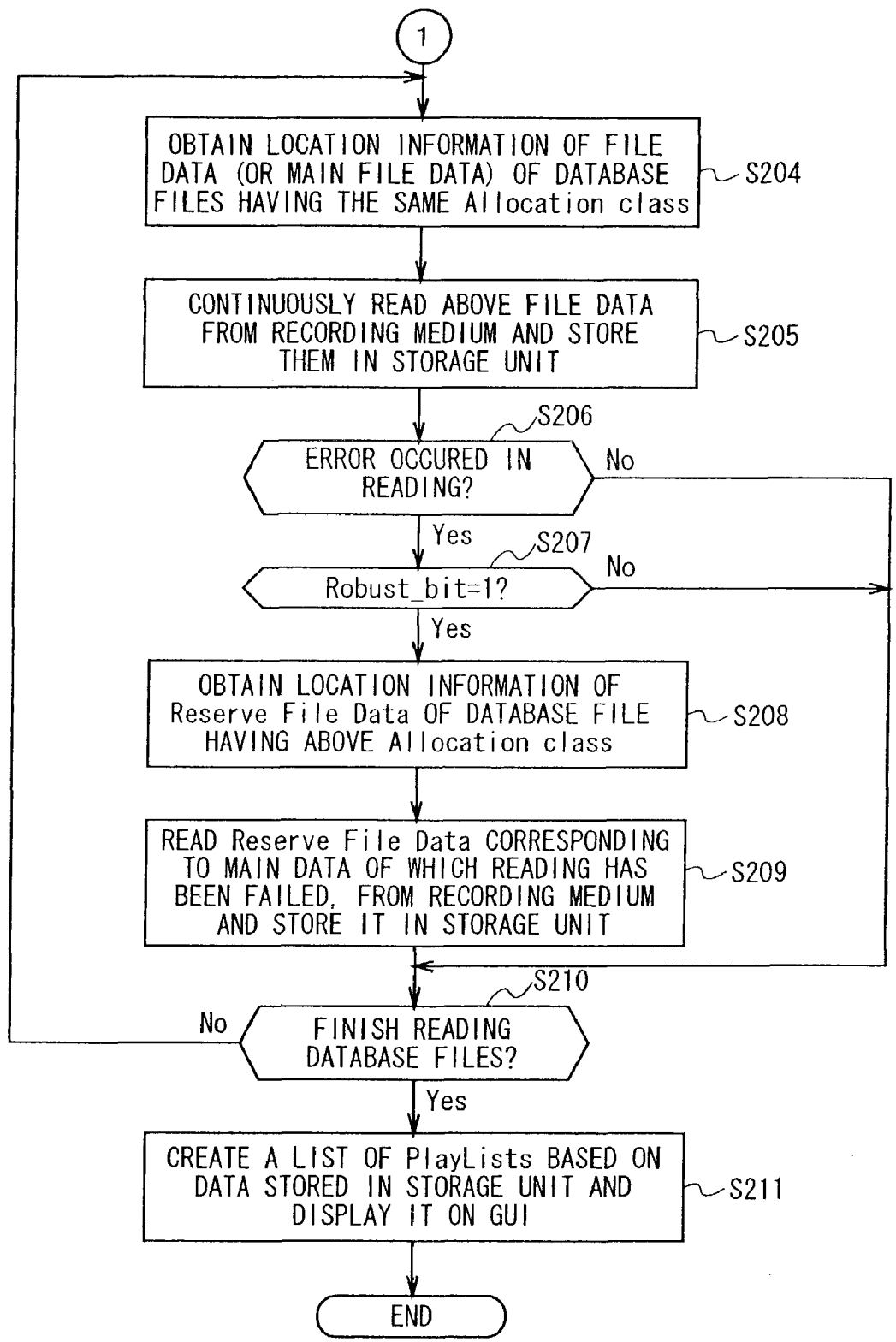
FIG. 55 is a flowchart explaining screen display processing of the list of PlayLists.

Next, the processing of displaying a list of PlayLists (a list of titles) recorded on the recording medium 10 will be explained with reference to the flowcharts of FIG. 54 and FIG. 55.

At step S201, the control unit 17 reads FSD (File System Descriptor) from the recording medium 10.

At step S202, the control unit 17 reads MIA (including Allocation Info of DVR files and Disc Region Table) and stores it in the storage unit 17A.

At step S203, the control unit 17 obtains Allocation class of the files recorded on the recording medium 10 and information of their Robust bits from MIA.

At step S204, the control unit 17 obtains the location information of file data (or Main file data) of database files having the same Allocation class, from Disc Region Table. For example, in the case where this time is the first execution of step S204, it obtains the location information of Main file data of Group-1 files.

At step S205, the control unit 17 continuously reads the file data from the recording medium 10 and stores them in the storage unit 17A.

At step S206, the control unit 17 checks whether an error has occurred in the reading operation of the file data of step S205. When yes, then the control unit 17 moves to step S207 to check whether the Robust bit of the above read file is 1. When yes, the control unit 17 moves to step S208 to obtain the location information of the Reserve File Data of the database file having the above Allocation class from Disc Region Table. At step S209, the control unit 17 reads the Reserve File Data corresponding to the Main data of which the reading has been failed, from the recording medium 10 and stores it in the storage unit 17A.

When a negative result is obtained at step S206 (when an error has not occurred in the reading operation of the file data), the process moves to step S210.

When a negative result is obtained at step S207 (when it is judges that the Robust bit is 0), the process moves to step S210. In this case, it is impossible to make compensation for the file data of which the recording has been failed.

At step S210, it is judged whether the reading of database files is completed. When no, then the process returns to step S204 to repeat the aforementioned processing. For example, the reading of files of Group-2 files will be performed next.

At step S211, the control unit 17 outputs a list of PlayLists recorded on the recording medium 10 to the terminal 20 serving as a user interface based on the information of database files stored in the storage unit 17A. Then the processing is completed.

Figure 56:
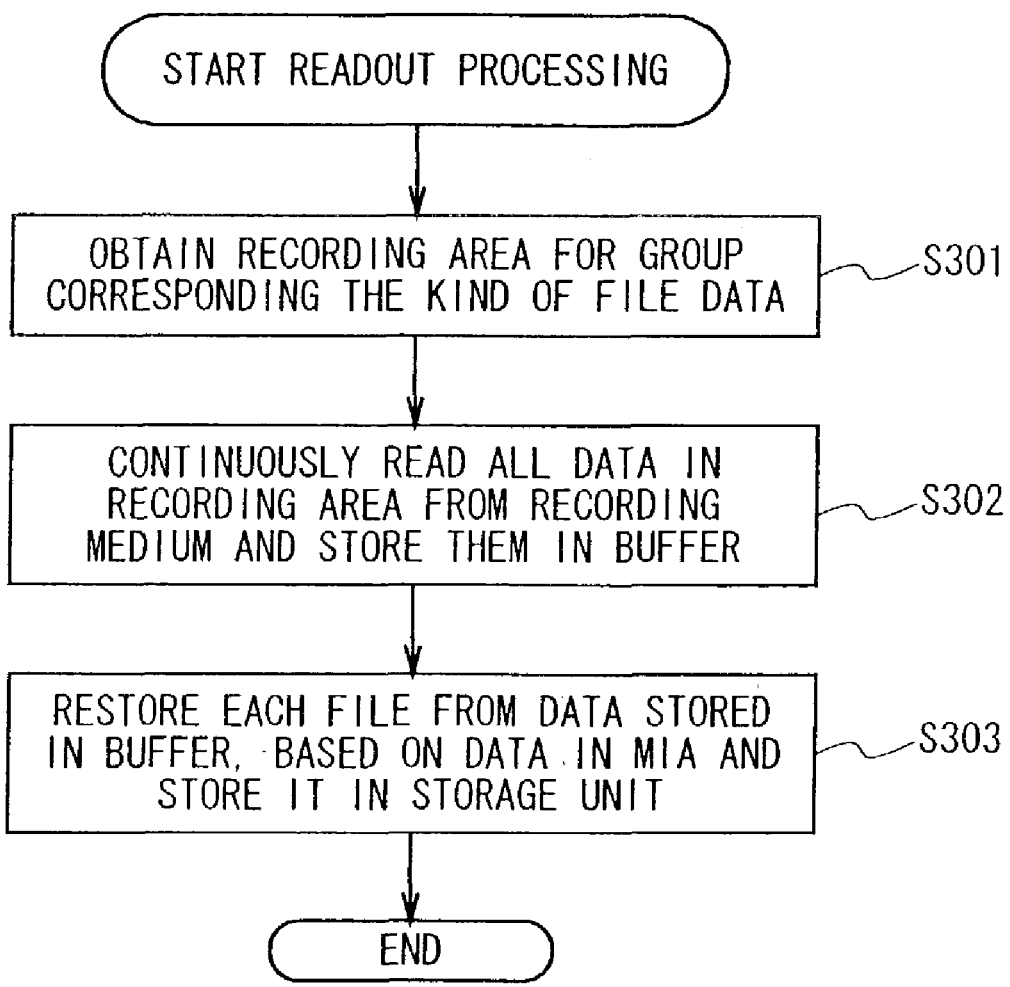
FIG. 56 is a flowchart explaining readout processing.
Figure 57:
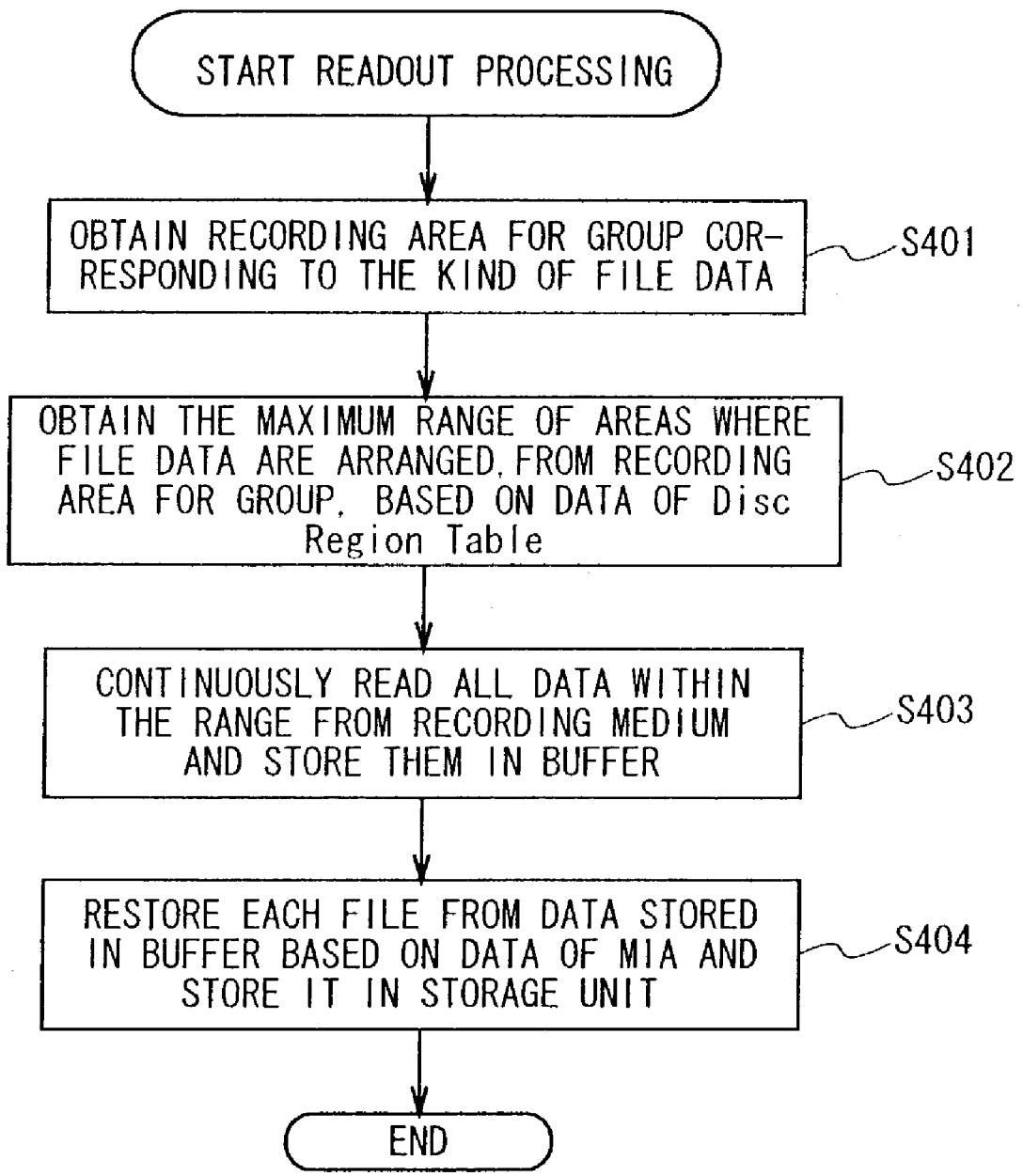
FIG. 57 is a flowchart explaining another readout processing.

Note that, at above step S205, the control unit 17 can read data of files one by one from the recording medium 10 based on each Disc Region Record (FIG. 21) of Disc Region Table (FIG. 20), but the reading of file data can be speeded up by the following processing of FIG. 56 or FIG. 57.

In the example of FIG. 56, step S301 is to obtain data in the recording area for the group (for example, Main LB Regions for Group-1 files) corresponding to the kind of file data.

Step S302 is to continuously read all data in the recording area for the group (all data including file data and data of free areas) from the recording medium 10 and store it in the buffer 71.

Step S303 is to restore each file from the data stored in the buffer 71 based on the data in MIA (management data of files), and to store it in the storage unit 17A (in the case of FIG. 47, file-1, file-2, file-3 and file-4 are restored).

In the example of FIG. 57, step S401 is to obtain data of the recording area for the group (for example, Main LB Regions for Group-1 files) corresponding to the kind of file data (Allocation class, Main file data or Reserve file data).

Step S402 is to obtain the maximum range of areas in which file data are arranged, in the recording area for the above group based on the data of Disc Region Table (for example, the range shown by "the maximum range of areas storing file data" in FIG. 47 (the range between the head of file-1 which is the first file and the tail of file-4 which is the last file)).

Step S403 is to continuously read all data (all data including file data and data of the free areas) within the above range from the recording medium 10 and to store them in the buffer 71.

Step S404 is to restore each file from the data stored in the buffer 71 based on the data of MIA (management data of files) and store it in the storage unit 17A (in the example of FIG. 47, file-1, file-2, file-3 and file 4 are restored).

In the aforementioned processing of step S402, the maximum range of areas where the file data are arranged can be obtained in the following manner.

As to each Disc Region Record (FIG. 21) of Disc Region Table (FIG. 20), Records which reference the recording area for a group (for example, Main LB Regions for Group-1 files) are obtained. That is, Records which reference the recording area for the group are obtained based on Start Logical Block Number and End Logical Block Number of Disc Region Record. The minimum value of Start Logical Block Number and the maximum value of End Logical Block Number are obtained based on the Records obtained. The range between the minimum number and the maximum number is the maximum range of areas in which file data are arranged, in the recording area for the group.

The aforementioned processing can be executed not only by hardware but also by software. In this case, programs composing the software are installed via the network or a recording medium into a computer having a special hardware or a normal personal computer which is capable of executing various functions by installing various programs.

As shown in FIG. 28, this recording medium may be not only the magnetic disk 51 (including a floppy disk), optical disc 52 (including CD-ROM (Compact Disc-Read Only Memory) and DVD (Digital Versatile Disc)), magneto-optical disc 53 (including MD (MiniDisc)) or package media such as a semiconductor memory 54, which store programs and are distributed to provide a user with programs separately from the apparatus, but also a ROM or hard disk which stores programs and are supplied to users by being incorporated into the apparatus.

Note that, in this description, steps which describe programs stored on the recording medium include processes which are not necessarily executed in time series but executed at the same time or separately, as well as processes which are executed in time series in the explained order.

Further, in this description, the system means the entire equipment composed of plural apparatuses.

As described above, this invention makes it possible to realize an information recording medium of which the information can be read rapidly.

Further, this invention makes it possible to read information rapidly.

Furthermore, this invention makes it possible to provide an information recording medium which is capable of reading information rapidly.

INDUSTRIAL UTILIZATION

The present invention relates to an information recording apparatus and method, information reproducing apparatus and method, information recording medium, program storage medium, and program which are capable of immediately displaying the titles of information recorded on the information recording medium, and can be used in an information recording/reproducing apparatus using a disc-like recording medium such as an optical disc, which is recordable and removable from the recording reproducing apparatus.

The invention claimed is:

1. An information recording apparatus comprising:
   identification unit identifying a location attribute of information to be recorded on an information recording medium, said information recording medium including a specified area and said location attribute including whether to record the information in said specified area and said location attribute corresponding to a type of information to be recorded;
   recording unit recording the information in said specified area on said information recording medium if said identification unit identifies that said attribute is a prescribed location attribute, and also recording an address of said specified area of said information recording medium on said information recording medium, wherein titles of content have the prescribed location attribute;
   detecting unit detecting continuous free areas in said specified area;
   comparison unit comparing a volume of said information with a total capacity of areas detected by said detecting unit; and
   forming unit forming, when said detecting unit detects that there is no continuous free area in said specified area capable of recording said information and said comparison unit determines that the total capacity of the areas detected by the detecting unit is greater than the volume of the information, a continuous free area capable of recording said information in said specified area by changing the location of existing information in said specified area such that the existing information is continuously recorded.

2. The information recording apparatus according to claim 1, wherein:
   said location attribute is one out of plural location attributes;
   said identification unit specifies the location attribute of said information out of said plural location attributes; and
   said recording unit records said information in an area corresponding to the location attribute specified out of said plural location attributes, including said specified area, in accordance with the identification result by said identification unit.

3. The information recording apparatus according to claim 1, wherein:
   said identification unit further specifies kind of said information; and
   said recording unit records said information in several areas of said specified area in accordance with the identification result by said identification unit.

4. The information recording apparatus according, to claim 1, wherein access points allow the user to select zones for reproduction.

5. The information recording apparatus according, to claim 1, wherein time stamps are used for access points in the recorded information.

6. The information recording apparatus according to claim 1, wherein first and second lists are for playlist files and the audio/video stream information file is for clip information files.

7. The information recording apparatus according to claim 6, wherein the playlist tiles include (a) a real playlist which shares an AV (audio visual) stream, and its attached information (CLIP) and (b) a virtual playlist which does not share data of CLIP.

8. The information recording apparatus according to claim 7, wherein the real playlist occupies the information recording medium by an amount of data equivalent to a stream of CLIP.

9. The information recording apparatus according to claim 7, wherein when an AV stream is recorded as a new CLIP, the real playlist is automatically created for referencing the new CLIP within zones which can be reproduced.

10. The information recording apparatus according to claim 7, wherein if a part of a zone for reproduction is deleted from the real playlist, data of corresponding stream is also deleted from CLIP.

11. The information recording apparatus according to claim 7, wherein if virtual playlist is changed or deleted, CLIP does not change.

12. The information recording apparatus according to claim 1, wherein an audio/video stream subdirectory includes a file storing contents data of audio visual (AV) data.

13. The information recording apparatus according to claim 1, wherein a playlist subdirectory includes user command information input by a user.

14. The information recording apparatus according to claim 13, wherein the user command information including at least (a) a desired reproduction zone and (b) time stamps set by a user for favorite scenes.

15. The information recording apparatus according to claim 1, wherein a playlist subdirectory is recorded in the specified area on said information recording, medium.

16. The information recording apparatus according to claim 1, wherein a playlist subdirectory including titles of contents and the audio/video stream information subdirectory including addresses indicating recording positions of the contents are collectively recorded in the specified area.

17. An information recording method comprising:
    an identification step of identifying a location attribute of information to be recorded on an information recording medium said information recording medium including a specified area and said location attribute including whether to record the information in said specified area and said location attribute corresponding to a type of information to be recorded;
    a recording step of recording the information in said specified area on said information recording medium if said identification step identifies that the location attribute is a prescribed location attribute, and also recording an address of said specified area of said information recording medium on said information recording medium, wherein titles of content have the prescribed location attribute;
    a detecting step of detecting continuous free areas in said specified area;
    a comparison step of comparing a volume of said information with a total capacity of areas detected by said detecting unit; and
    a forming step of forming, when said detecting unit detects that there is no continuous free area in said specified area capable of recording said information and said comparison unit determines that the total capacity of the areas detected by the detecting unit is greater than the volume of the information, a continuous free area capable of recording said information in said specified area by changing the location of existing information in said specified area such that the existing information is continuously recorded.

18. A non-transitory program storage medium encoded with a computer program with computer readable instructions for a computer to execute, comprising the steps of:

an identification step of identifying a location attribute of information to be recorded on an information recording medium said information recording medium including a specified area and said location attribute including whether to record the information in said specified area and said location attribute corresponding to a type of information to be recorded;

a recording step of recording the information in said specified area on said information recording medium if said identification step identifies that the location attribute is a prescribed location attribute, and also recording an address of said specified area of said information recording medium on said information recording medium, wherein titles of content have the prescribed location attribute;

a detecting step of detecting continuous free areas in said specified area;

a comparison step of comparing volume of said information with a total capacity of areas detected by said detecting unit; and a forming step of forming, when said detecting unit detects that there is no continuous free area in said specified area capable of recording said information and said comparison unit determines that the total capacity of the areas detected by the detecting unit is greater than the volume of the information, a continuous free area capable of recording said information in said specified area by changing the location of existing information in said specified area such that the existing information is continuously recorded.

19. A program encoded on a non-transitory computer readable medium with computer readable instructions for a computer to execute for performing the steps of:

an identification step of identifying a location attribute of information to be recorded on an information recording medium, said information recording medium including a specified area and said location attribute including whether to record the information in said specified area and said location attribute corresponding to a type of information to be recorded;

a recording step of recording information in said specified area on said information recording medium if said identification step identifies that the location attribute is a prescribed location attribute, and also recording an address of said specified area of said information recording medium on said information recording medium, wherein titles of content have the prescribed location attribute;

a detecting step of detecting continuous free areas in said specified area;

a comparison step of comparing a volume of said information with a total capacity of areas detected by said detecting unit; and a forming step of forming, when said detecting unit detects that there is no continuous free area in said specified area capable of recording said information and said comparison unit determines that the total capacity of the areas detected by the detecting unit is greater than the volume of the information, a continuous free area capable of recording said information in said specified area by changing the location of existing information in said specified area such that the existing information is continuously recorded.

* * * * *